United States Patent
Lessing et al.

(10) Patent No.: US 10,576,643 B2
(45) Date of Patent: Mar. 3, 2020

(54) SENSORS FOR SOFT ROBOTS AND SOFT ACTUATORS

(71) Applicant: President and Fellows of Harvard College, Cambridge, MA (US)

(72) Inventors: Joshua Aaron Lessing, Cambridge, MA (US); George M. Whitesides, Newton, MA (US); Ramses V. Martinez, Somerville, MA (US); Dian Yang, Cambridge, MA (US); Bobak Mosadegh, New York, NY (US); Kevin C. Galloway, Somerville, MA (US); Firat Güder, Watertown, MA (US); Alok Suryavamsee Tayi, Somerville, MA (US)

(73) Assignee: President and Fellows of Harvard College, Cambridge, MA (US)

(*) Notice: Subject to any disclaimer, the term of this patent is extended or adjusted under 35 U.S.C. 154(b) by 173 days.

(21) Appl. No.: 15/503,549

(22) PCT Filed: Aug. 21, 2015

(86) PCT No.: PCT/US2015/046350
§ 371 (c)(1),
(2) Date: Feb. 13, 2017

(87) PCT Pub. No.: WO2016/029143
PCT Pub. Date: Feb. 25, 2016

(65) Prior Publication Data
US 2017/0239821 A1 Aug. 24, 2017

Related U.S. Application Data

(60) Provisional application No. 62/102,363, filed on Jan. 12, 2015, provisional application No. 62/040,905, filed on Aug. 22, 2014.

(51) Int. Cl.
*B25J 18/06* (2006.01)
*B25J 9/14* (2006.01)
(Continued)

(52) U.S. Cl.
CPC ............... *B25J 18/06* (2013.01); *B25J 9/142* (2013.01); *B25J 13/085* (2013.01); *B25J 13/087* (2013.01);
(Continued)

(58) Field of Classification Search
CPC ...... B25J 13/088; B25J 13/085; B25J 13/087; B25J 15/0009; B25J 15/12; B25J 18/06; B25J 9/142
See application file for complete search history.

(56) References Cited

U.S. PATENT DOCUMENTS 4,337,921 A 7/1982 Edwards
4,976,191 A * 12/1990 Suzumori ............... B23Q 1/34
92/103 R
(Continued)

FOREIGN PATENT DOCUMENTS

DE 102009029972 A1 12/2010
EP 0534778 A2 3/1993
(Continued)

OTHER PUBLICATIONS

Anisfield Ascension Technology Puts Spotlight on DC field magnetic motion tracking, HP chonical vol. 17, Aug. 2000 (Year: 2000).*
(Continued)

*Primary Examiner* — Rachid Bendidi
(74) *Attorney, Agent, or Firm* — Wilmer Cutler Pickering Hale and Dorr LLP

(57) ABSTRACT

A soft robotic device with one or more sensors is described. The sensor may be embedded in the soft body of the soft
(Continued)

robotic device, attached to the soft body of the soft robotic device, or otherwise linked to the soft body of the soft robotic device.

33 Claims, 27 Drawing Sheets

(51) Int. Cl.
    *B25J 13/08* (2006.01)
    *B25J 15/00* (2006.01)
    *B25J 15/12* (2006.01)

(52) U.S. Cl.
    CPC ......... *B25J 13/088* (2013.01); *B25J 15/0009* (2013.01); *B25J 15/12* (2013.01)

(56) References Cited

U.S. PATENT DOCUMENTS

| | | | | |
|---|---|---|---|---|
| 5,568,957 | A * | 10/1996 | Haugs | B25J 15/12 294/119.3 |
| 6,718,766 | B2 | 4/2004 | Seto et al. | |
| 7,198,594 | B2 | 4/2007 | Shahinpoor | |
| 2002/0157388 | A1* | 10/2002 | Seto | B25J 9/142 60/325 |
| 2006/0028041 | A1 | 2/2006 | Ono et al. | |
| 2009/0137952 | A1 | 5/2009 | Ramamurthy et al. | |
| 2010/0258362 | A1 | 10/2010 | Trimmer | |
| 2010/0295417 | A1 | 11/2010 | Wood et al. | |
| 2010/0319341 | A1* | 12/2010 | Blitz | F15B 15/10 60/530 |
| 2011/0198019 | A1* | 8/2011 | Tilson | A61B 17/8816 156/155 |
| 2012/0031218 | A1 | 2/2012 | Galloway et al. | |
| 2012/0271339 | A1 | 10/2012 | O'Beirne et al. | |
| 2013/0110289 | A1 | 5/2013 | Cho et al. | |
| 2013/0312541 | A1 | 11/2013 | Majidi et al. | |
| 2014/0041904 | A1 | 2/2014 | Pedder | |
| 2014/0109560 | A1* | 4/2014 | Ilievski | B25J 9/1075 60/327 |
| 2014/0180134 | A1 | 6/2014 | Hoseit | |
| 2015/0257839 | A1* | 9/2015 | Vause | A61B 17/22032 606/130 |
| 2015/0309563 | A1* | 10/2015 | Connor | G06F 3/011 73/865.4 |

FOREIGN PATENT DOCUMENTS

| | | |
|---|---|---|
| EP | 1190819 A1 | 3/2002 |
| GB | 2296941 A | 7/1996 |
| JP | S63266357 A | 11/1988 |
| JP | H02-134465 A | 5/1990 |
| JP | H04-370407 A | 12/1992 |
| JP | 2006-204612 A | 8/2006 |
| JP | 2010-214474 A | 9/2010 |
| JP | 2014-533975 A | 12/2014 |
| WO | WO-98/49976 A1 | 11/1998 |
| WO | WO-01/72479 A1 | 10/2001 |
| WO | WO-2007/015324 A1 | 2/2007 |
| WO | WO-2012/124546 A1 | 9/2012 |
| WO | WO-2012/148472 A2 | 11/2012 |
| WO | WO-2013/033669 A2 | 3/2013 |
| WO | WO-2013/038301 A2 | 3/2013 |
| WO | WO-2013/110086 A1 | 7/2013 |
| WO | WO-2013/130760 A2 | 9/2013 |
| WO | WO-2013/148340 A2 | 10/2013 |
| WO | WO-2014/113781 A1 | 7/2014 |

OTHER PUBLICATIONS

Abate, C. J., "The Basics of Thermocouples", Circuit Cellar, retrieved online from URL:<http://circuitcellar.com/cc-blog/the-basics-of-thermocouples/>, Jul. 19, 2012 (8 pages).

Andersson, P., et al., "Active Matrix Displays Based on All-Organic Electrochemical Smart Pixels Printed on Paper," Advanced Materials, vol. 14, Issue 20, pp. 1460-1464 (Oct. 16, 2002).

Barr, M. C., et al., "Direct Monolithic Integration of Organic Photovoltaic Circuits on Unmodified Paper," Advanced Materials, vol. 23, Issue 31, pp. 3500-3505 (Aug. 16, 2011).

Chen, R., et al., "Modeling and Analysis of Electric Field and Electrostatic Adhesion Force Generated by Interdigital Electrodes for Wall Climbing Robots," IEEE/RSJ International Conference on Intelligent Robots and Systems (IROS), Tokyo, Japan, 6 pages—entire document (Nov. 3-7, 2013).

Gorrn, P., et al., "Isotropically stretchable gold conductors on elastomeric substrates," Soft Matter, vol. 7, Issue 16, pp. 7177-7180 (Jul. 5, 2011).

Graudejus, O., et al., "Encapsulating Elastically Stretchable Neural Interfaces: Yield, Resolution, and Recording/Stimulation of Neural Activity," Advanced Functional Materials, vol. 22, Issue 3, pp. 640-651 (Feb. 8, 2012).

Graz, I. M., et al., "Silicone substrate with in situ strain relief for stretchable thin-film transistors," Applied Physics Letters, vol. 98, pp. 124101-1 to 124101-3 (Mar. 22, 2011).

Guo, L. and DeWeerth, S. P., "High-Density Stretchable Electronics: Toward an Integrated Multilayer Composite," Advanced Materials, vol. 22, Issue 36, pp. 4030-4033 (Sep. 22, 2010).

Hu, L., et al., "Highly conductive paper for energy-storage devices," Proceedings of the National Academy of Sciences, vol. 106, issue 51, pp. 21490-21494 (Dec. 22, 2009).

Hu, W., et al., "An elastomeric transparent composite electrode based on copper nanowires and polyurethane," Journal of Materials Chemistry C, vol. 2, Issue 7, pp. 1298-1305 (Dec. 5, 2013).

International Search Report and Written Opinion issued by the European Patent Office as International Searching Authority for International Application No. PCT/US2013/022593 dated May 7, 2013 (10 pages).

International Search Report and Written Opinion issued by the European Patent Office as International Searching Authority for International Application No. PCT/US2013/028250 dated Aug. 30, 2013 (19 pages).

International Search Report and Written Opinion issued by the U.S. Patent and Trademark Office for International Application No. PCT/US16/13013, dated Nov. 14, 2016 (12 pages).

International Search Report and Written Opinion issued by the U.S. Patent and Trademark Office for International Application No. PCT/US2015/046350 dated Nov. 27, 2015 (8 pages).

International Search Report and Written Opinion issued by the U.S. Patent and Trademark Office for International Application No. PCT/US2015/046319 dated Nov. 23, 2015 (10 pages).

Jeong, G. S., et al., "Solderable and electroplatable flexible electronic circuit on a porous stretchable elastomer," Nature Communications, vol. 3, No. 977, 8 pages (Jul. 31, 2012).

Jiang, H., et al., "Finite deformation mechanics in buckled thin films on compliant supports," Proceedings of the National Academy of Sciences, vol. 104, No. 40, pp. 15607-15612 (Oct. 2, 2007).

Jo, J., et al., "Fabrication of Printed Organic Thin-Film Transistors Using Roll Printing," Japanese Journal of Applied Physics, vol. 48, No. 4, pp. 04C181-1-04C181-4, 6 pages (Apr. 20, 2009).

Jones, J., et al., "Stretchable wavy metal interconnects," J. Vac. Sci. Technol. A, vol. 22, No. 4, pp. 1723-1725 (Jul. 24, 2004).

Kaltenbrunner, M., et al., "Arrays of Ultracompliant Electrochemical Dry Gel Cells for Stretchable Electronics," Advanced Materials, vol. 22, Issue 18, pp. 2065-2067 (May 11, 2010).

Keplinger, C., et al., "Stretchable, Transparent, Ionic Conductors," Science, vol. 341, Issue 6149, pp. 984-987, 6 pages (Aug. 30, 2013).

Kettlgruber, G., et al., "Intrinsically stretchable and rechargeable batteries for self-powered stretchable electronics," Journal of Materials Chemistry A, vol. 1. Issue 18, pp. 5505-5508, 5 pages (Mar. 7, 2013).

Khang, D.-Y., et al., "A stretchable form of single-crystal silicon for high-performance electronics on rubber substrates," Science, vol. 311, pp. 208-212, 6 pages (Jan. 13, 2006).

Kim, D.-H., et al., "Materials and noncoplanar mesh designs for integrated circuits with linear elastic responses to extreme mechani-

(56) References Cited

OTHER PUBLICATIONS cal deformations," Proceedings of National Academy of Sciences, vol. 105, No. 48, pp. 18675-18680 (Dec. 2, 2008).
Koo, H.-J., et al., "Towards All-Soft Matter Circuits: Prototypes of Quasi-Liquid Devices with Memristor Characteristics," Advanced Materials, vol. 23, Issue 31, pp. 3559-3564 (Aug. 16, 2011).
Lacour, S. P., et al., "An elastically stretchable TFT circuit," Electronic Device Letters, IEEE, vol. 25, Issue 12, pp. 792-794 (Dec. 1, 2004).
Lacour, S. P., et al., "Stretchable Interconnects for Elastic Electronic Surfaces," Proceedings of the IEEE, vol. 93, Issue 8, pp. 1459-1467 (Aug. 1, 2005).
Lee, M.-T., et al., "Rapid selective metal patterning on polydimethylsiloxane (PDMS) fabricated by capillarity-assisted laser direct write," Journal of Micromechanics and Microengineering, vol. 21, 095018, 11 pages (Aug. 12, 2011).
Liu, X., et al., "Paper-based piezoresistive MEMS sensors," Lab on a Chip, vol. 11, pp. 2189-2196 (Jul. 7, 2011).
Martins, R., et al., "Complementary Metal Oxide Semiconductor Technology with and on Paper," Advanced Materials, vol. 23, Issue 29, pp. 4491-4496 (Oct. 18, 2011).
Mazzeo, A. D., et al., "Paper-Based, Capacitive Touch Pads," Advanced Materials, vol. 24, pp. 2850-2856 (Apr. 27, 2012).
Monkman, G. J., "An Analysis of Astrictive Prehension," The International Journal of Robotics Research, vol. 16, No. 1, pp. 1-10 (Feb. 1, 1997).
Monkman, Gareth, "Electroadhesive microgrippers", Industrial Robot: An International Journal, vol. 30 Iss: 4, pp. 326-330, 7 pages (Jul. 2, 2003).
Nyholm, L., et al., "Toward Flexible Polymer and Paper-Based Energy Storage Devices," Advanced Materials, vol. 23, Issue 33, pp. 3751-3769 (Sep. 1, 2011).
Prahlad, H., et al., "Electroadhesive Robots-Wall Climbing Robots Enabled by a Novel, Robust, and Electrically Controllable Adhesion Technology," IEEE International Conference on Robotics and Automation, Pasadena, CA, pp. 3028-3033 (May 19-23, 2008).
Sekitani, T., et al., "A Rubberlike Stretchable Active Matrix Using Elastic Conductors," Science, vol. 321, Issue 5895, pp. 1468-1472, 7 pages (Sep. 12, 2008).
Sekitani, T., et al., "Organic transistors manufactured using inkjet technology with subfemtoliter accuracy," Proceedings of the National Academy of Sciences, vol. 105, No. 13, pp. 4976-4980 (Apr. 1, 2008).
Sekitani, T., et al., "Stretchable active-matrix organic light-emitting diode display using printable elastic conductors," Nature Materials, vol. 8, pp. 494-499, 8 pages (May 10, 2009).
Siegel, A. C., et al., "Foldable Printed Circuit Boards on Paper Substrates," Advanced Functional Materials, vol. 20, pp. 28-35 (Jan. 8, 2010).
Sirringhaus, H., et al., "High-Resolution Inkjet Printing of All-Polymer Transistor Circuits," Science, vol. 290, Issue 5499, pp. 2123-2126, 6 pages (Dec. 15, 2000).
Someya, T., et al., "Conformable, flexible, large-area networks of pressure and thermal sensors with organic transistor active matrixes," Proceedings of the National Academy of Sciences, vol. 102, No. 35, pp. 12321-12325 (Aug. 30, 2005).
Tian, H., et al., "Graphene-on-Paper Sound Source Devices", ACS Nano, vol. 5, No. 6, pp. 4878-4885 (May 19, 2011).
Verilhac, J.-M., et al., "Step toward robust and reliable amorphous polymer field-effect transistors and logic functions made by the use of roll to roll compatible printing processes," Organic Electronics, vol. 11, Issue 3, pp. 456-462 (Mar. 1, 2010).
Weng, Z., et al., "Graphene-Cellulose Paper Flexible Supercapacitors," Advanced Energy Materials, vol. 1, Issue 5, pp. 917-922, 6 pages (Sep. 16, 2011).
Xu, S., et al., "Stretchable batteries with self-similar serpentine interconnects and integrated wireless recharging systems," Nature Communications, vol. 4, No. 1543, 8 pages (Feb. 26, 2013).
Zschieschang, U., et al., "Organic Electronics on Banknotes," Advanced Materials, vol. 23, Issue 5, pp. 654-658 (Feb. 1, 2011).
Lilienthal, A. J., et al., "Airborne Chemical Sensing with Mobile Robots," Sensors, vol. 6, Issue 11, pp. 1616-1678, Nov. 20, 2006.
Onal, Cagdas, et al., "A Modular Approach to Soft Robots," The Fourth IEEE RAS/EMBS International Conference on Biomedical Robots and Biomechatronics, Rome, Italy, Jun. 24-27, 2012, 8 pages.
Extended European Search Report issued by the European Patent Office for European Application No. 15834002.6 dated May 11, 2018 (8 pages).
Extended European Search Report issued by the European Patent Office for European Application No. 15834529.8 dated May 11, 2018 (8 pages).
Extended European Search Report issued European Patent Office for European Application No. 16780397.2 dated May 15, 2018 (7 pages).
Ficuciello, "Modelling and Control for Soft Finger Manipulation and Human-Robot Interaction," Ph.D. Thesis, University of Naples Federico II, Nov. 2010, 89 pages.
Park et al., "Exoskeletal Force-Sensing End-Effectors With Embedded Optical Fiber-Bragg-Grating Sensors," IEEE Transactions on Robotics, Dec. 2009, vol. 25, No.6, pp. 1319-1331.

* cited by examiner

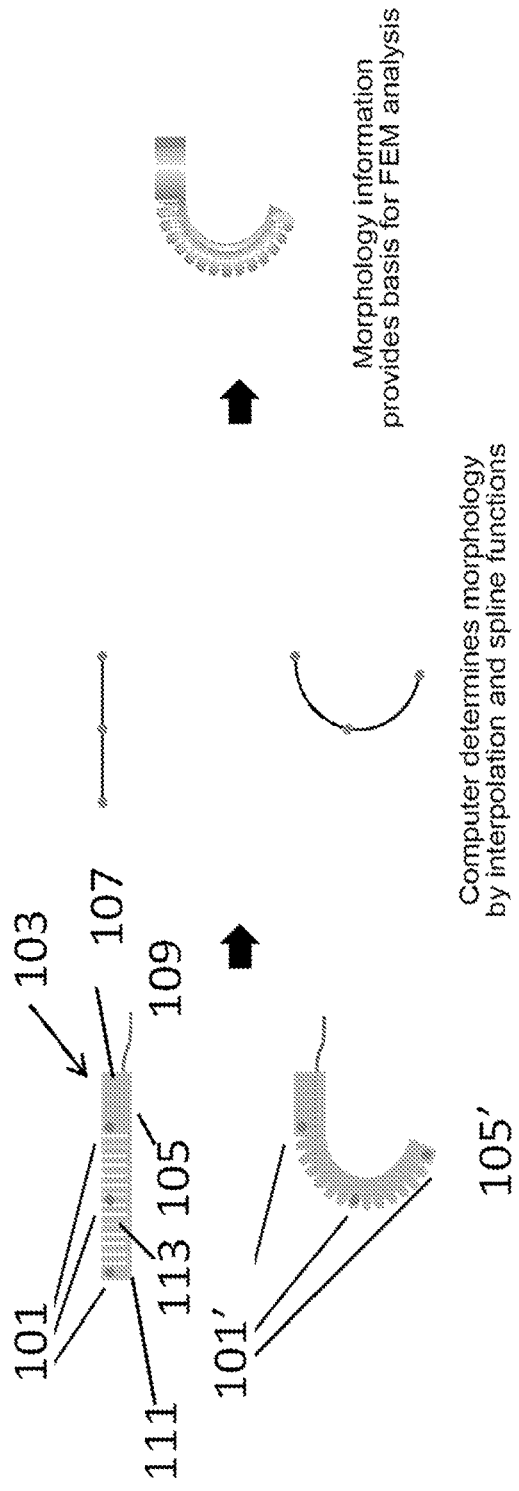

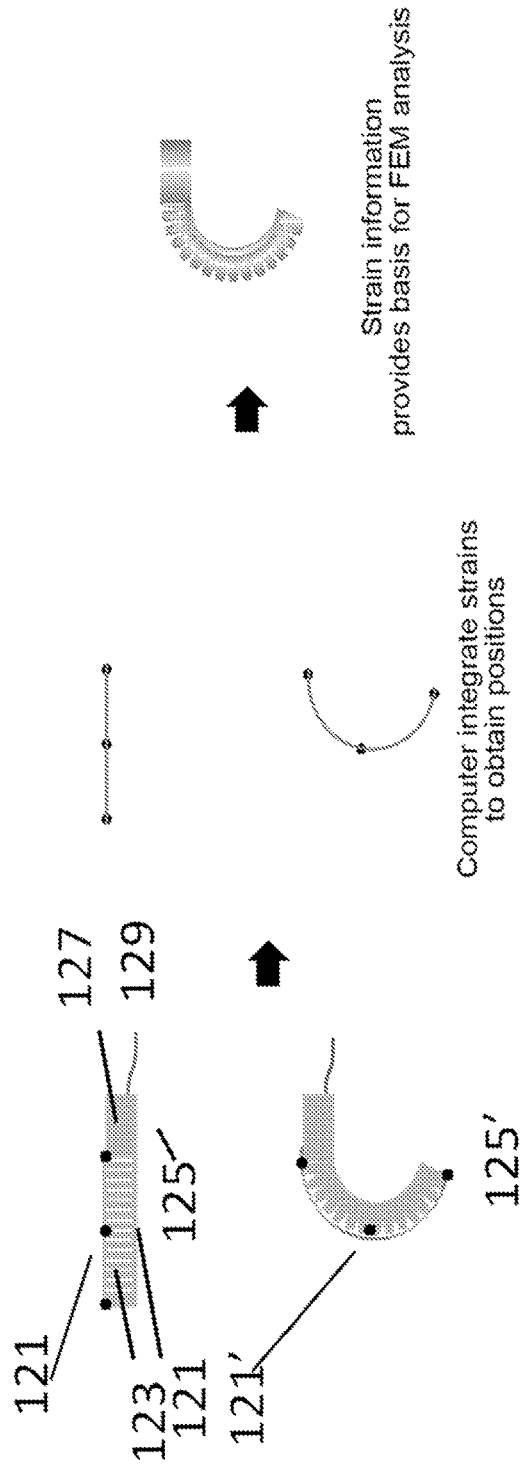

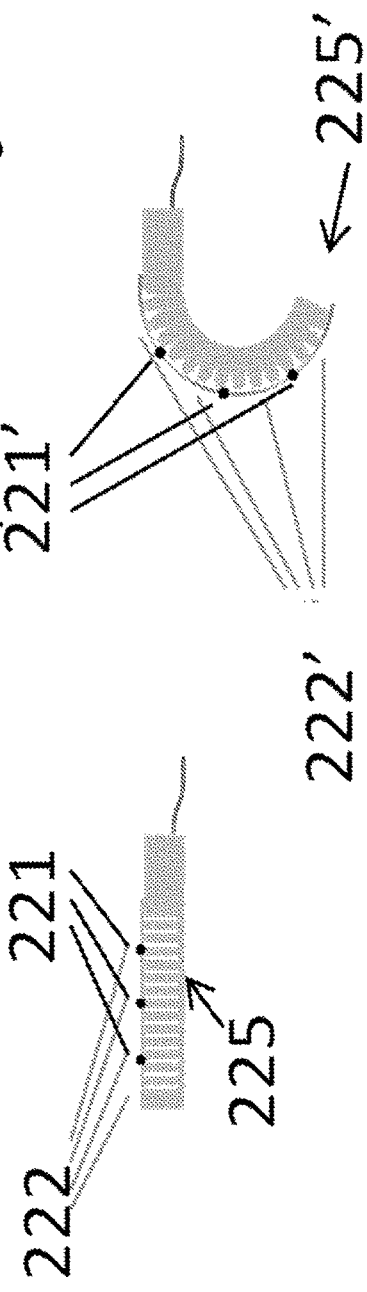

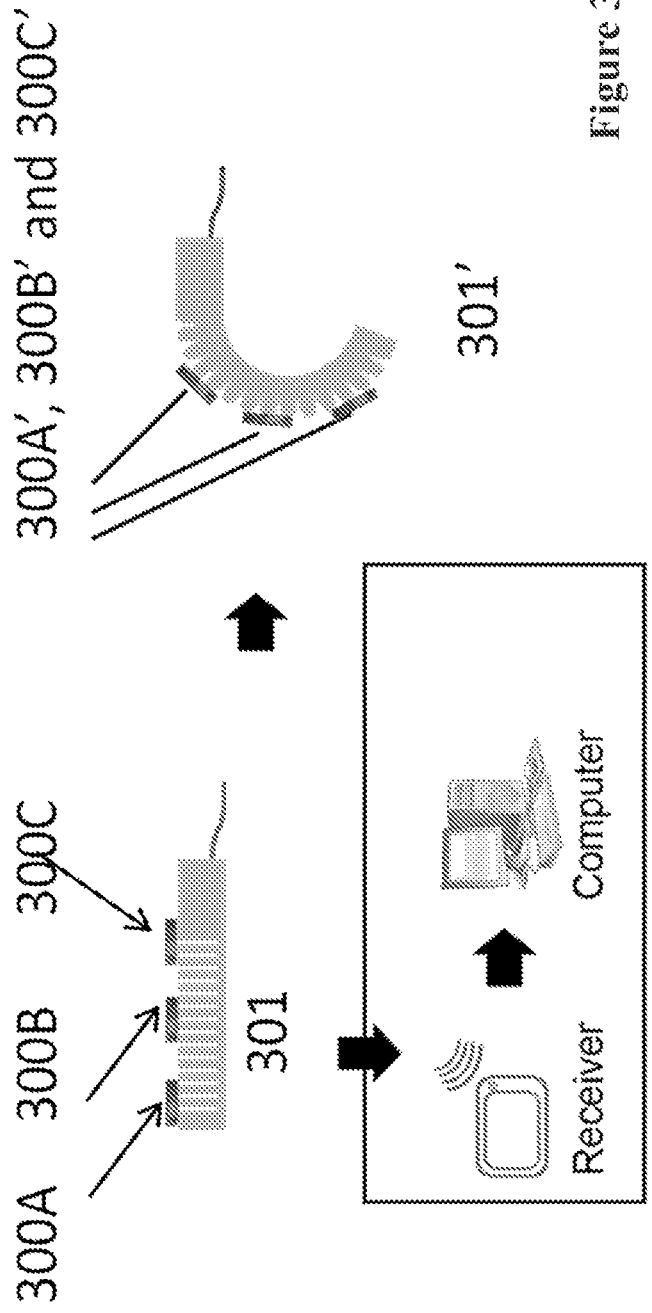

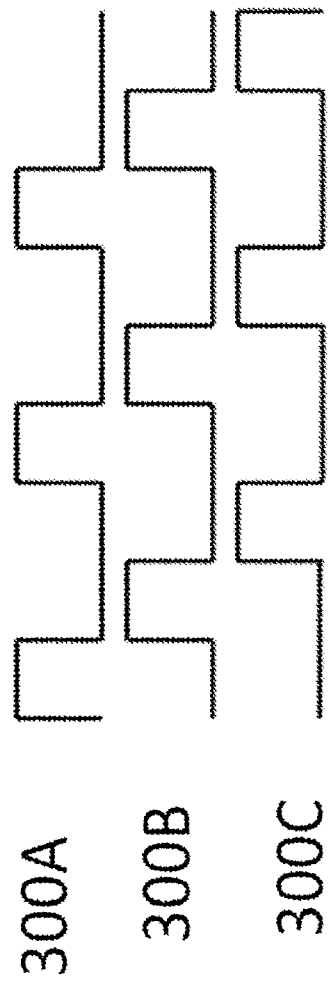

Figure 6e
Figure 6f
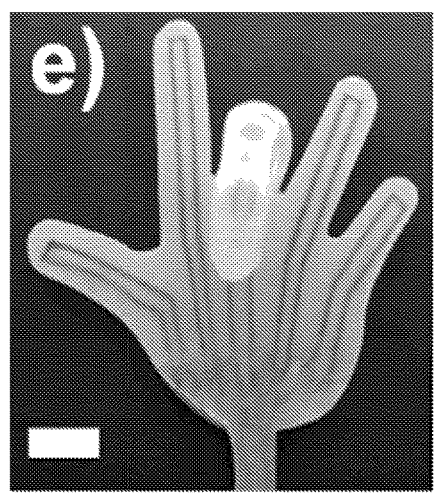
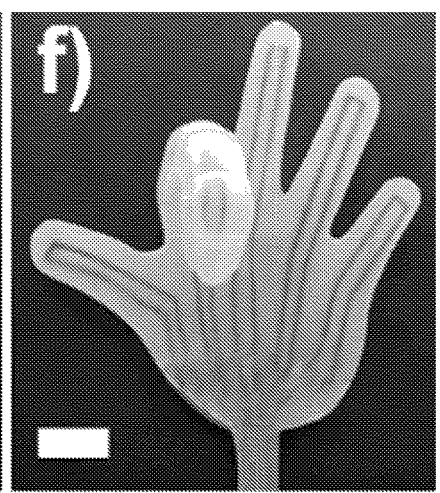
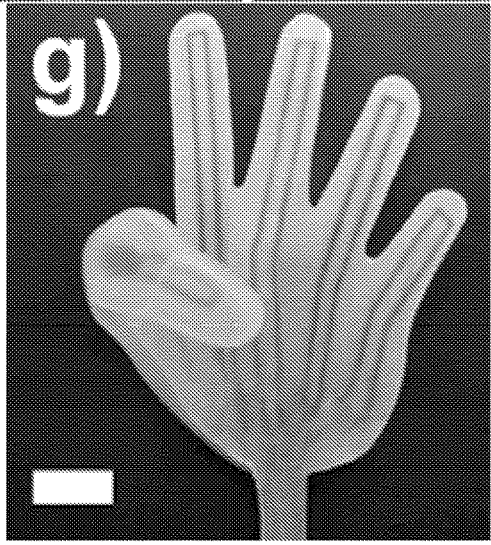
Figure 6g

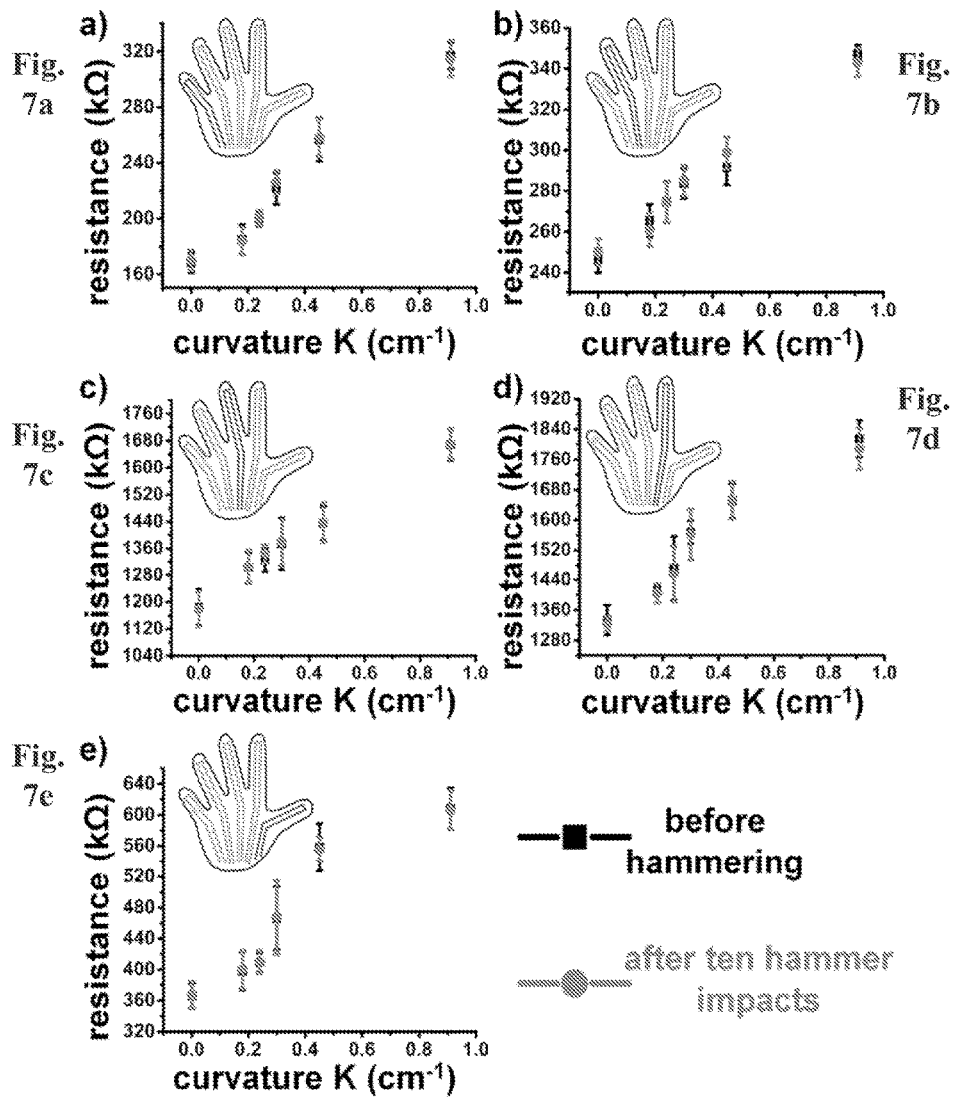

Figure 14a
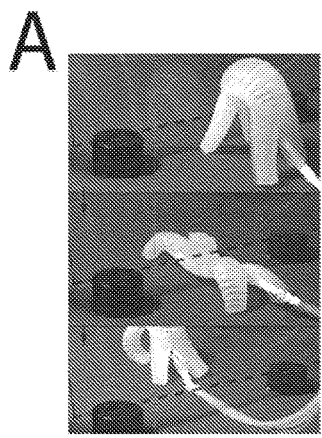
Figure 14b
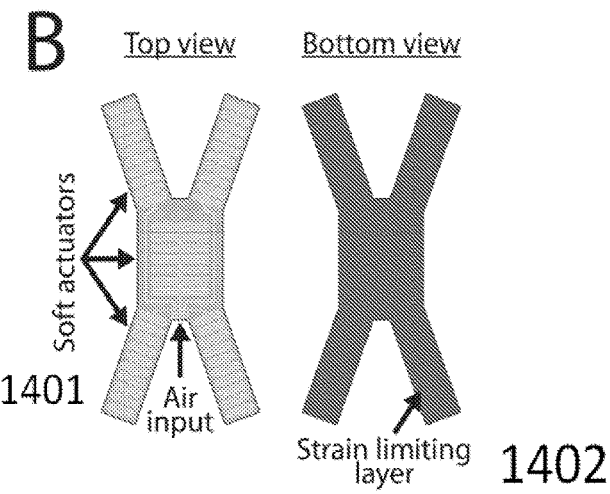
C Soft quadruped with a distributed sensor network attached to the strain limiting layer
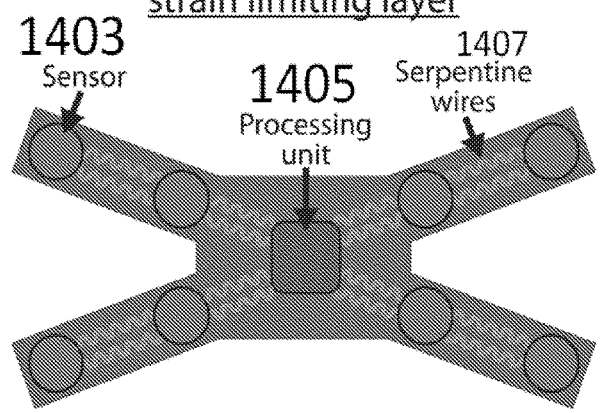
Figure 14c

SENSORS FOR SOFT ROBOTS AND SOFT ACTUATORS

INCORPORATION BY REFERENCE

All patents, patent applications and publications cited herein are hereby incorporated by reference in their entirety. The disclosures of these publications in their entireties are hereby incorporated by reference into this application in order to more fully describe the state of the art as known to those skilled therein as of the date of the invention described herein.

RELATED APPLICATION

This Application is a national Stage Entry of PCT International Application No. PCT/US2015/046350 filed Aug. 21, 2015, which claims the benefit and priority to U.S. Provisional application 62/040,905, filed Aug. 22, 2014, and to U.S. Provisional application 62/102,363, filed Jan. 12, 2015, the contents of which are hereby incorporated by reference in their entirety.

GOVERNMENT RIGHTS

This invention was made with government support under grants W911NF-11-1-0094 awarded by Defense Advanced Research Projects Agency (DARPA) and DMR-0820484 awarded by National Science Foundation (NSF). The U.S. government has certain rights in the invention.

TECHNICAL FIELD

This technology relates generally to soft robots or soft actuators that integrate sensors.

BACKGROUND

Soft devices are machines built from soft materials (e.g., elastomers, gels, liquids). These soft devices are useful for their ability to change their size and shape readily upon electrical, chemical, pneumatic, ferrofluidic, or hydraulic actuation. In addition, the low stiffness of the elastomeric materials used to construct these devices (Young's modulus <10 MPa) enables them to deform readily in response to external forces. These attributes allow soft devices to perform functions that are challenging for hard machines. Examples include interacting with delicate, soft materials (e.g., biological tissues), and performing unstructured tasks (e.g., gripping objects of undefined shape). Machines, whether they are hard or soft, typically require the integration of electrical components (e.g. motors, sensors, microcontrollers, displays, pumps, batteries, etc.) in order to perform sophisticated tasks. These devices must be controlled in order to create an autonomous or semi-autonomous soft robotic system.

Knowing the morphology of a soft actuator is important for making a control system for a soft robot. This is because, unlike a hard robot, a soft robot can change volume and shape based on pneumatic or hydraulic inflation pressure or by forces in the external environment. In addition, unlike a hard robot, the response of the soft material of the actuator to force, whether external or internal, is highly non-linear making calculations that predict the behavior of the actuator in response to force very complex and difficult.

Having to know the morphology of the robot is an emergent problem that was not as prominent in the world of conventional hard robots. In a hard robot, force from the external environment generates a simpler outcome. For example, force applied to a hard robotic arm will move the arm a fixed distance that is easy to calculate since the robot is made from a series of hard components and linkages that do not deform during standard operation. In contrast, when force from the external environment is applied to a soft robotic arm, one gets a very complex outcome since the soft arm will both move and deform.

Additionally, the stiffness of the elastomer that makes up the actuator may change during actuation. For example, if the inflation pressure is at 30% of the max inflation pressure of an actuator, the elastomer is in a low strain state where the elastomer has stiffness "A"; and when the inflation pressure is at 80% of the max inflation pressure, the elastomer is in a higher strain state with a different stiffness "B". As a result, a different amount of force is required to achieve each increment of actuation.

Due to the intrinsic properties of elastomers, the stress vs. strain profile can be different for extension and relaxation. Elastomers show a high degree of hysteresis during cycles of loading and unloading. This discrepancy between the loading and unloading profile will change depending on how fast one cycles between the two. So as a result the system has memory. This aspect of elastomers will make soft actuators difficult to control using just the knowledge of the inflation pressure of the actuator. See, also, http://www.s-cool.co.uk/a-level/physics/stress-and-strain/revise-it/stress-strain-graphs.

SUMMARY

In one aspect, soft robotic devices with integrated sensors that provide information about the state of the robot and/or its environment are presented.

In one aspect, a soft robotic device with a sensor or a network of sensors is described. In certain embodiments, the sensor(s) are used for the determination of the position, morphology, and/or physical state at points along the soft actuator or soft robot. The sensors may include electronic, mechanical, optical, ultrasound, piezzo-electrical, or magnetic sensors. The use of the sensor or network of sensors will allow for a real time observation of the soft robotic device's current state, for example its three-dimensional position in space, velocity, acceleration as well as sensing/perception of information about its environment, e.g., temperature, presence of a certain chemical or biological agent. The feedback from the sensors can serve as inputs to a control system that determines the subsequent actions of the soft robotic device.

Thus, in certain embodiments, the instantly disclosed systems and methods to control an actuator based on data relating to the soft actuator's state.

In one aspect, a soft robotic device is described, including:
  an elastomeric body having one chamber or a plurality of interconnected chambers disposed within the body and a pressurizing inlet that is configured to receive fluid for the chamber or the plurality of interconnected chambers; and
  at least one sensor configured to generate a readout correlating with the state of the soft robotic device.

In any of the embodiments described herein, the state of the soft robotic device is one or more variables selected from the group consisting of the soft robotic device's position, the soft robotic device's orientation, the soft robotic device's velocity, the soft robotic device's acceleration, the elapsed time since the soft robotic device is last actuated, the maximum pressure of the pressurizing fluid used during the soft robotic device's last actuation, the volume of pressurizing fluid in the soft robotic device, the surface curvature of the elastomeric body, material stress or strain at points along the elastomeric body, material strain at points along the elastomeric body, the force being applied by the soft robotic device on an object, the soft robotic device's temperature, the pressure inside and outside the soft robotic device, and the pressure differential between the pressurizing fluid inside chamber and the ambient pressure in the soft robotic device's external environment.

In any of the embodiments described herein, the sensor is configured to detect a physical, chemical, or electronic signal.

In any of the embodiments described herein, the sensor is embedded in or attached to the elastomeric body.

In any of the embodiments described herein, the pressurizing inlet is configured to receive fluid from an external fluid source.

In any of the embodiments described herein, the soft robotic device further comprises a strain limited layer disposed along one side of the elastomeric body; and wherein the sensor is embedded in or attached to the strain limited layer.

In any of the embodiments described herein, the soft robotic device comprises one or more sensors embedded in or attached to the strain limited layer and one or more other sensors embedded in or attached to the elastomeric body.

In any of the embodiments described herein, the strain limited layer is stiffer or less stretchable than the elastomeric body.

In any of the embodiments described herein, the sensor is selected from the group consisting of thermal sensors, strain sensors, stress sensors, volumetric sensor, torque sensors, shear sensors, chemical sensors, biological sensors, neural sensors, pressure sensors, barometric pressure sensors, vacuum sensors, altimeters, conductivity sensors, impedance sensors, inertial measurement units, force sensing resistors, laser range finders, acoustic range finders, magnetometers, Hall Effect sensors, magneto-diodes, magneto-transistors, MEMS magnetic field sensors, microphones, photo detectors, accelerometers, gyroscope sensors, flow sensors, humidity sensors, chemiresistors, volatile organic compound sensors, heavy metal sensors, pH sensors, sedimentation sensors, cardiac ablation sensors, myoelectric sensors, electronic noses, gas sensors, oxygen sensors, nitrogen sensors, natural gas sensors, VX gas sensors, sarin gas sensors, mustard gas sensors, explosives detectors, metal detectors, radiological detectors, voltage sensors, and current sensors.

In any of the embodiments described herein, the sensor is selected from the group consisting of volumetric, positional, strain, flow, Inertial Measurement Unit (IMU), temperature, and magnetic sensors.

In any of the embodiments described herein, the soft robotic device comprises at least two different sensors.

In any of the embodiments described herein, the soft robotic device comprises a network of sensors distributed in the soft robotic device.

In any of the embodiments described herein, the sensor is non-stretchable or stretchable.

In any of the embodiments described herein, one of the sensors is a microelectromechanical system (MEMS) sensor, a pressure sensor, a force sensor, or an Inertial Measurement Unit (IMU).

In any of the embodiments described herein, the soft robotic device is a gripper or a robotic hand.

In any of the embodiments described herein, the gripper comprises sensors configured to perform grasp detection or configured to control the force the gripper applies to the object it is grasping.

In any of the embodiments described herein, the soft robotic device is an end-of-arm tool for a robotic arm, delta robot, scara robot, gantry system or a mobile robotic platform.

In another aspect, a soft robotic system is described, including:
  the soft robotic device of any one of the embodiments described herein; and
  at least one of a processor operably linked to the sensor to receive a readout from the sensor and interpret the readout; and
  a control system configured to control the movement of the soft robot based on the readout generated by the one or more sensors or the processor's interpretation of the readout.

In any of the embodiments described herein, the processor comprises a magnetic motion capture system and the one or more sensors comprise a network of electromagnetic sensors to act as active markers for the magnetic motion capture system for use as a data input for the processor to conduct a finite element analysis or to fit a reduced system model for the soft robotic device.

In any of the embodiments described herein, the one or more sensors comprise a network of strain sensors, accelerometers, magnetometers, gyroscopes, torque sensors, shear sensors, force sensors, or Inertial Measurement Unit (IMU) sensor packages.

In any of the embodiments described herein, the processor is configured to conduct a finite element analysis or to fit a reduced system model based on the sensor readout.

In any of the embodiments described herein, the one or more sensors comprise a pressure sensor, a flow sensor, a volumetric sensor, or a network thereof.

In any of the embodiments described herein, the processor is configured to conduct a finite element analysis or to fit a reduced system model based on the readout from the pressure sensors.

In any of the embodiments described herein, the soft robotic system further includes:
  instructions embedded in the processor to instruct the control system to begin a corrective action if the pressure sensor generates a pressure readout over a threshold value; or
  instructions embedded in the processor to instruct the control system to begin a corrective action if the flow sensor generates a flow rate readout over a threshold value; or
  instructions embedded in the processor to instruct the control system to begin a corrective action if the volumetric sensor generates a fluid volume inside the chamber to be over a threshold value.

In any of the embodiments described herein, the sensor is a force sensor and the soft robotic system further comprises instructions embedded in the processor to instruct the control system to begin a corrective action once the force sensor detect a force readout over a threshold value.

In any of the embodiments described herein, the force sensor is attached to the surface of the elastomeric body and the processor is configured to interpret the force sensor's readout to determine the elastomeric body's morphology.

In any of the embodiments described herein, the processor is configured to determine the soft robotic device's morphology based on the force sensor's readout in conjunction with the inflation pressure and the volume of fluid received by the chamber or the plurality of interconnected chambers.

In any of the embodiments described herein, the sensor is an Inertial Measurement Unit (IMU); and/or wherein the control system uses the sensor's readout or the processor's interpretation of the readout to control the actions of the soft robotic device.

In any of the embodiments described herein, the processor is configured to conduct a finite element analysis or to fit a reduced system model for the soft robotic device based on the sensor's readout, or to estimate the size and/or shape of an object in contact with the soft robotic device based on the sensor's readout.

In any of the embodiments described herein, the control system controls the soft robotic device to carry out a range of motions, or limit a range of motions.

In any of the embodiments described herein, the soft robotic system is a surgical device selected from the group consisting of retractors, stents, endoscopes, arthroscopes, and laparoscopic instruments.

In any of the embodiments described herein, the one or more sensors comprises a temperature sensor to monitor changes in the operation temperature of the soft robot; and the control system is configured to control the fluid inlet's pressure in response to changes in temperature based on the temperature sensor's readout.

In any of the embodiments described herein, the one or more sensors comprises a flow sensor to monitor changes in the operation flow rate or pressure of the pressurized fluid through the fluid inlet; and the control system is configured to control the flow rate of the pressurized fluid based on the readout of the flow sensor.

In any of the embodiments described herein, the processor is configured to interpret the readout from the sensors to perform real time measurement of the soft robotic device's morphology and to send instructions to the control system to compensate for hysteresis.

In yet another aspect, a method for sensing the state of the soft robotic device of any embodiments described herein is disclosed, including obtaining readout from the one or more sensors transmitted to the processor; and determining a state of the soft robotic device.

In any of the embodiments described herein, the method further includes conducting a finite element analysis or to fit a reduced system model based on the readout from the pressure sensors using the processor.

In any of the embodiments described herein, the sensor is a flow, pressure, IMU, volumetric, or force sensor, and the method further includes:
  instructing the control system to begin a corrective action if the pressure sensor generates a pressure readout over a threshold value; or
  instructing the control system to begin a corrective action if the flow sensor generates a flow rate readout over a threshold value; or
  instructing the control system to begin a corrective action if the volumetric sensor generates a fluid volume inside the chamber to be over a threshold value; or
  instructing the control system to begin a corrective action once the force sensor detect a force readout over a threshold value; or
  interpreting the force sensor's readout to determine the elastomeric body's morphology; or
  conducting a finite element analysis or to fit a reduced system model for the soft robotic device based on the sensor's readout; or
  estimating the size and/or shape of an object in contact with the soft robotic device based on the sensor's readout; or
  interpreting the readout from the sensors to perform real time measurement of the soft robotic device's morphology and sending instructions to the control system to compensate for hysteresis.

In yet another aspect, a method for sensing the state of the soft robotic system of any embodiments described herein is disclosed, including obtaining readout from the one or more sensors; optionally interpreting the readout by using the processor; and controlling the actuation and/or movement of the soft robot based on the readout.

As used herein, the term "soft robotic device" refers to a soft robot or a soft actuator. As used herein, the term "strain limited layer" and "strain limiting layer" are used interchangeably. Strain is a description of deformation in terms of relative displacement of a body. A deformation results from a stress induced by applied forces, in the case here, for example, by the pressurizing force. Because materials of lower stiffness or smaller elastic modulus will deform to a greater degree than the higher elastic modulus materials, the low stiffness materials experience more strain or deformation. As a result, the strain in the material of higher stiffness or greater elastic modulus is smaller or "limited." As used herein, the layer or wall or portion thereof the soft robot that extends, bends, expands or unfolds at lower threshold force is the 'extensible' or 'low strain' member. The layer or wall or portion thereof the soft robot that extends, bends, expands or unfolds at higher threshold force is referred herein to the "strain limited" layer or wall or membrane.

In certain embodiments, the term "strain limiting layer" refers to a layer which is stiffer or less stretchable than the elastomeric body and is attached or secured to the elastomeric body. In one or more embodiments, the strain limited layer is more than about 10%, 20%, >50%, >100%, or >500% stiffer than the elastomeric body.

As used herein, the term "state" of the soft robot refers to the general operation status of the soft robot. The state of a soft robot or its system is described by a set of state variables. The state variables of a system are any set of measurable quantities that together provide enough information about the system to describe the present and/or future behavior of a robot and what the user wished to observe set of variables as sufficient is that behavior of the system measurable quantity or set of measurable quantities the user desires to observe. A sufficient set of state variables can consist of a single measurable quantity or a set of measurable quantities depending on the system and what the user wishes to observe. The criteria for defining a set of state variables as sufficient is that the set provides enough information to accurately predict or approximate the present and/or future behavior of a measurable quantity or set of measurable quantities the user desires to observe. Non-limiting examples of state variables for a soft robot include the robot's position, the robot's orientation, the robot's velocity, the robot's acceleration, the elapsed time since the robot was last actuated, the maximum pressure of the pressurizing fluid used during the robots last actuation, the volume of pressurizing fluid in an actuator, the surface curvature of an actuator, material stress at points along the body of the robot, material strain at points along the body of the robot, the force being applied by the robot on an object, the robots temperature, the pressure inside of an actuator, the pressure outside of an actuator, the pressure differential between the pressurizing fluid inside of an actuator and the ambient pressure in the actuators external environment.

BRIEF DESCRIPTION OF THE FIGURES

The following images also describe details for multiple applications and features that can be incorporated into a soft robot or soft actuator according to one or more embodiments. The invention is described with reference to the following figures, which are presented for the purpose of illustration only and are not intended to be limiting. In the Drawings:

FIG. 1a shows point sensors sensing position/morphology/stress/strain state changes; and FIG. 1b shows strain sensors sensing position/morphology/stress/strain state changes according to one or more embodiments.

FIG. 2c shows a network of hard strain sensors on strain isolating layers with serpentine connecting wires according to according to one or more embodiments.

FIG. 3a shows a network of electro-magnets attached to a soft actuator; and FIG. 3b shows the pulse sequence for the electromagnets firing in series to provide differentiation of the spatial origin of each signal according to according to one or more embodiments.

FIGS. 6c, 6d, 6e, 6f, 6g shows the actuation of the little finger, ring finger, middle finger, index finger, thumb, by the controlled inflation of the different pneumatic channels, respectively.

FIGS. 7a, 7b, 7c, 7d, and 7e illustrate the dependence of the electrical resistance of the c-PDMS sensors with the curvature of the little finger, ring finger, middle finger, index finger, and thumb, respectively, before and after hitting the soft actuator ten times with a hammer.

FIG. 14a shows a photograph of a soft robot crawling under a glass plate; FIG. 14b shows (on the left) an illustration of the pneumatic network on the top layer of the robot shown in FIG. 14a (on the right) an illustration of the strain limiting layer on the bottom of the robot shown in FIG. 14a; and FIG. 14c shows an illustration of a distributed network of sensors on the strain limiting layer of a soft robot.

DETAILED DESCRIPTION

Figure 2A:
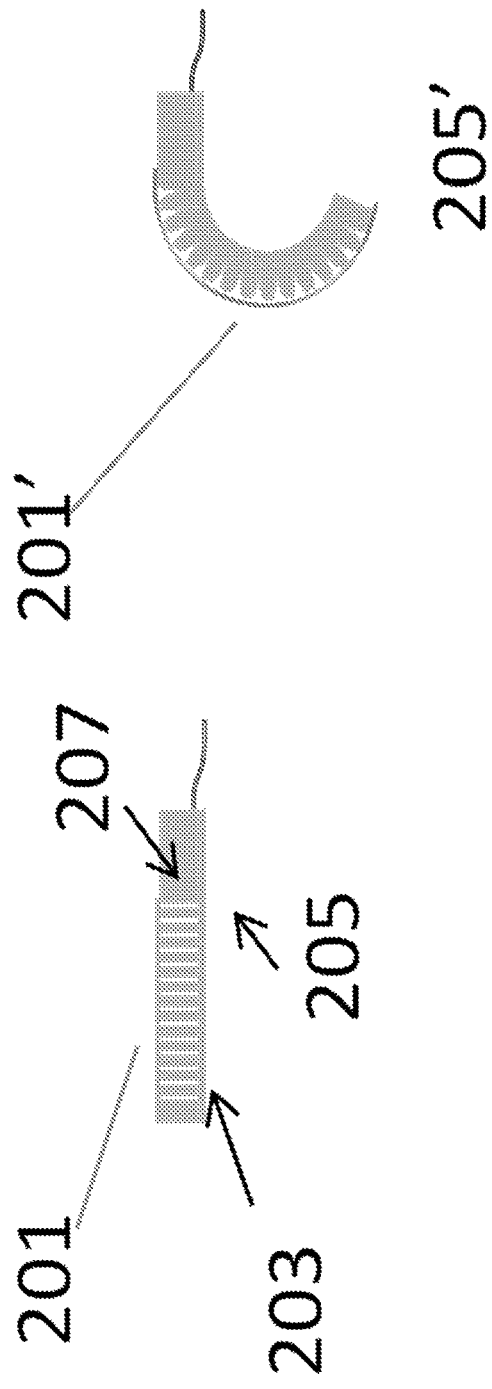
FIG. 2a illustrates a large strain sensor that spans the entire actuator.

A soft robotic device having one or more sensor(s) integrated, embedded, attached, or otherwise linked or connected to the soft robotic device is described. In one aspect, a soft robot is described, including an elastomeric body having one chamber or a plurality of interconnected chambers disposed within the body, the elastomeric body comprising a pressurizing inlet that is configured to receive fluid into the chamber or the plurality of interconnected chambers from a fluid source; and optionally a strain limited layer disposed along the elastomeric body; and at least one sensor. In certain embodiments, the sensor is configured to detect a physical, chemical, and/or electronic signal. In certain embodiments, the one or more sensors are embedded, integrated, attached, or otherwise linked or connected to the elastomeric body. In certain embodiments, the one or more sensors are embedded, integrated, attached, or otherwise linked or connected to the strain limited layer. In still certain embodiments, one or more sensors are embedded, integrated, attached, or otherwise linked or connected to the strain limited layer and one or more other sensors is embedded, integrated, attached, or otherwise linked or connected to the elastomeric body.

In certain embodiments, the sensor is one or more sensors selected from the group consisting of thermal sensors, strain sensors, stress sensors, torque sensors, volumetric sensor, shear sensors, chemical sensors, biological sensors, neural sensors, pressure sensors, barometric pressure sensors, vacuum sensors, altimeters, conductivity sensors, impedance sensors, inertial measurement units, force sensing resistors, laser range finders, acoustic range finders, magnetometers, Hall Effect sensors, magneto-diodes, magneto-transistors, MEMS magnetic field sensors, microphones, photo detectors, accelerometers, gyroscope sensors, flow sensors, humidity sensors, chemiresistors, volatile organic compound sensors, heavy metal sensors, pH sensors, sedimentation sensors, cardiac ablation sensors, myoelectric sensors, electronic noses, gas sensors, oxygen sensors, nitrogen sensors, natural gas sensors, VX gas sensors, sarin gas sensors, mustard gas sensors, explosives detectors, metal detectors, radiological detectors, voltage sensors, and current sensors.

In certain embodiments, the soft robot described herein includes more than one type of sensors. In certain embodiments, the soft robot described herein include two or more types of sensors selected from the group consisting of thermal sensors, volumetric sensor, strain sensors, stress sensors, torque sensors, shear sensors, chemical sensors, biological sensors, neural sensors, pressure sensors, barometric pressure sensors, vacuum sensors, altimeters, conductivity sensors, impedance sensors, inertial measurement units, force sensing resistors, laser range finders, acoustic range finders, magnetometers, Hall Effect sensors, magneto-diodes, magneto-transistors, MEMS magnetic field sensors, microphones, photo detectors, accelerometers, gyroscope sensors, flow sensors, humidity sensors, chemiresistors, volatile organic compound sensors, heavy metal sensors, pH sensors, sedimentation sensors, cardiac ablation sensors, myoelectric sensors, electronic noses, gas sensors, oxygen sensors, nitrogen sensors, natural gas sensors, VX gas sensors, sarin gas sensors, mustard gas sensors, explosives detectors, metal detectors, radiological detectors, voltage sensors, and current sensors. The use of more than one type of sensors in a soft robot will provide rich information (e.g., curvature, position or location) regarding the status of the soft robot.

In some embodiments, the sensors, sensor networks, or sensor systems typically are flexible and compliant, and capable of large deformation of equal or greater range than the soft actuator itself.

In other embodiments, the sensor includes metallic conductors that are stretchable by patterning them into serpentine or wavy thin sheets of metal, such as those presented in the work of John Rogers and Sigurd Wagner (See "A shapely future for circuits", www.economist.com/node/18304110).

Still in further embodiments, a network of hard sensors with serpentine connecting wires can be embedded or attached to the actuator. See, e.g., serpentine wires 1407 in FIG. 14*c*. By utilizing metallic conductors patterned in stretchable geometries (e.g., serpentine or wavy patterns), one can imbed existing hard electronic sensors to and connect these hard sensors with stretchable metallic conductors, forming an overall compliant sensing network. Thus, when the soft robot is actuated and in a bent state, the hard sensors connected by serpentine wires still maintain their proper functions and provide information on the actuator's state.

In other embodiments, A non-compliant (inflexible) sensor can be used if its size is relatively small (e.g., less than 100 mm, 50, or 10 mm in its longest dimension). In certain embodiments, the sensor has a size of less than about 200 mm$^2$, 150 mm$^2$, 100 mm$^2$, 50 mm$^2$, 10 mm$^2$, or 5 mm$^2$. Networks of very small sensors and circuits on elastomers has been described (See "A shapely future for circuits", www.economist.com/node/18304110). Hard components are placed on "strain isolating" islands that form a network on the surface of the elastomeric device. In this case, when the system (elastomer+electronics) is elongated, the regions of elastomer around the strain isolating islands elongate but the islands themselves only experience a small degree of strain. As a result the electronics on those islands remain unharmed. In general if the rigid object embedded in the elastomer is small enough, one can rely on the fact that the system will still stretch. In these embodiments, the small sensors can be embedded or attached to the elastomeric body and/or the strain limited layer.

In certain embodiments, using this island approach, the surface of a soft actuator (on the elastomeric body and/or the strain limited layer) can include small ridged microelectromechanical system (MEMS) sensors (e.g., accelerometers, magnetometers, gyroscopes) for determining the morphology, position, velocity, and acceleration of a soft actuator. In certain embodiments, using this island approach, the surface of a soft actuator (on the elastomeric body and/or the strain limited layer) can include small ridged microelectromechanical system (MEMS) sensors. In other embodiments, using this island approach, small ridged microelectromechanical system (MEMS) sensors can be embedded in the soft actuator.

In one or more embodiments, the sensor is a strain sensor configured to provide a resistance measurement and resistance is correlated to a curvature, position or location of the strain limited layer or the elastomeric body. In one or more embodiments, the strain sensor is configured to provide a capacitance measurement and capacitance is correlated to a curvature, position or location of the strain liming layer or the elastomeric body.

In one or more embodiments, the sensor is a position sensor configured to provide a position measurement of the soft robots location in three dimensional space.

In one or more embodiments, the sensor is a pressure sensor configured to provide a pressure measurement and the pressure measurement is correlated to a grip strength of the soft robot.

In one or more embodiments, the sensor is a temperature sensor. In certain specific embodiments, the temperature sensor is a thermocouple configured to provide a voltage measurement and the voltage is correlated to a temperature of the strain limited layer or the elastomeric body. In other embodiments, the temperature sensor is a resistance temperature detector, thermistor, or zener diode, and resistance or voltage is measured for temperature determination. In certain embodiments, the elastomer's stiffness as a function of temperature is known, so one may determine the stiffness of the elastomer based on the temperature readout and in turn determine the curvature of the actuator at a known actuation pressure and temperature using finite element analysis to achieve a temperature dependent curvature calibration method. In other embodiments, one can inflate the actuator at different temperatures and measure its curvature as a function of pressure to develop a calibration method empirically.

The soft robot can be any robot having an expandable body that is capable of expansion or collapse on change of pressure. In some embodiments, the soft body of the soft robotic device has a pressurizing inlet that is configured to communicate with a fluid source, an expandable body and a strain limited layer secured to a portion of the expandable body. The examples of the actual construction of the soft robot are non-limiting and the expandable body can be, for example, made from a plurality of expandable fluidly interconnected chambers; where the pressurizing inlet is configured to communicate with the plurality of expandable interconnected chambers, or made using one or more elastomeric chambers configured to expand upon fluidic pressurization and/or contract upon vacuum actuation. In other embodiments, the expandable body is made from one or more flexible or extensible chambers configured to unbend or unfold upon fluidic pressurization. Optionally, the soft body robotic device further includes a strain limited layer, which is stiffer or less stretchable than the elastomeric body, attached to the elastomeric body. In one or more embodiments, the strain limited layer is more than about 10%, 20%, >50%, >100%, or >500% stiffer than the elastomeric body. The elastomeric body in the soft body robotic device can be configured to preferentially expand when the chamber or the plurality of interconnected chambers are pressurized by the fluid, causing a bending motion around the strain limiting layer. In other embodiments, a strain limited layer is wrapped around the body in a helix to form a twisting actuator. See, WO 2012/148472; International Application No. PCT/US13/28250 filed Feb. 28, 2013; International Application No. PCT/US13/22593 filed Jan. 22, 2013 and U.S. Provisional application Ser. No. 61/885,092, filed Oct. 1, 2013, for non-limiting description of soft actuators suitable for use in the current invention, the contents of which are incorporated by reference.

In certain embodiments, the soft robot system further includes a control system for controlling the motion of the soft robot based at least in part on data obtained from one or more sensors.

Sensors for State Estimation of a Soft Actuator or Soft Robot

The sensors for state estimation of a soft actuator is now described in detail. To control a robot's actions, a real time observation of the robot's current state, for example its 3D position in space, velocity, and acceleration, can be used as input to a control system that determines the subsequent actions of the robot. In addition, recording the state of a robot as a function of time is useful for analyzing the behavior of a robot for testing, failure analysis, or as a data input for developing a reduced physical model for predicting its actuation behavior. Sensors can be integrated into a soft actuator or soft robot to determine its physical state. Non limiting examples of possible readout include the soft robot's position, morphology, internal pressure, velocity, acceleration, and stress/strain states.

In certain embodiments, a soft robot system including the soft robotic device described herein including a sensor (e.g., a position sensor) and a processor is described, wherein the sensor is operably connected or linked with a processor, (e.g. a microprocessor), and the processor is configured to receive and process a readout provided by the sensor using one or more data analysis/data-fitting methods known in the art to obtain relevant information of the soft robot's state or information about the environment. The processor can be mounted on the soft robot ("on-board") or located remotely ("off-board"). In certain embodiments, the soft robotic system further includes a control system configured to receive the relevant information processed by the processor and to alter the soft robot's state (e.g., velocity, acceleration, morphology, actuating state, curvature of the soft body, the force the soft robot applies on a surface or object) or movement (e.g., moving direction) based on the information. In other embodiments, a user may process the readout manually and instruct the control system to alter the soft robot's state (e.g., velocity, acceleration, morphology, actuating state, curvature of the soft body, the force the soft robot applies on a surface or object) or movement (e.g., moving direction) based on the information.

In certain embodiments, the method of data processing by the processor can include spline functions or other interpolation methods (e.g., Linear interpolation, Cosine interpolation, Cubic interpolation, Hermite interpolation, Nearest-neighbor interpolation, Inverse distance weighting, etc.). The density of sensors will determine the precision of the morphological data. Furthermore, the morphology information provides information on the actuators strain state. In addition, by combining this data with knowledge of the material properties of the soft actuator or soft robot, a user or the processor can perform finite element method (FEM) analysis to determine the strain state of the soft actuator or soft robot (FIG. 1a).

Position Sensor

In certain embodiments, the sensor is a point position sensor. Position sensors detect the position of something which means that they are referenced either to or from some fixed point or position. These types of sensors provide a "positional" feedback. Such sensors measure and report the physical positions of themselves. Exemplary position sensors include Hall effect sensors, GPS sensors, ultrasonic range finders, and laser range finders. When these position sensors are placed at various positions on a soft actuator or soft robot (e.g., on the strain limited layer, the elastomeric body, or both), the position and morphology of the soft device can be determined. Position determination can be accomplished using conventional methods including spline functions or other interpolation methods (e.g., Linear interpolation, Cosine interpolation, Cubic interpolation, Hermite interpolation, Nearest-neighbor interpolation, Inverse distance weighting, etc.).

As shown in FIG. 1a, an uninflated soft robot 105 has a strain limited layer 111 and an elastomeric body 107 which contains a plurality of inflatable chambers 113 connected to an outside fluid source via tube 109. A plurality of point sensors 101 are attached to the surface 103 of the elastomeric body (e.g., a robot arm) 107, e.g., using an adhesive, or by embedding into the body of the arm. In certain embodiments, this could be implemented either by inserting the sensor 101 into the elastomeric body 107 during the molding process or embedding it in between layers after molding has been performed. In other embodiments, adding of an inextensible sensor to the soft robot could be done by integrating the sensor 101 into the strain-limiting layer 105 that would not stretch when a robot is actuated (not shown). See, co-pending International application filed on even date herewith and entitled "Flexible Electronic Strain-limiting Layer for Soft Actuators," PCT/US15/46319, for details on incorporating sensors onto the strain limiting layer. Alternatively, if the sensor needs to be added to a soft layer that expands upon actuation, one can either use soft stretchable sensors or incorporate small hard sensors that are localized/attached to strain isolating plastic or silica foil islands that are connected with lithographically deposed serpentine shaped gold wires.

When the soft robot is at rest (not actuated), the position sensors transmit their locations to a processor by wired or wireless means and the soft robot morphology (shape) may be determined by a computer/processor as in a straight line set by the positions sensors (FIG. 1a, middle-upper portion). This can be done by making a relative distance measurement. In this case there is a reference object or set of reference objects in the environment or on the robot whose position or whose positions are known. Next the sensor measures its distance from the reference object or set of reference objects. In the case of a Hall effect sensor, one can measure the distance between the sensor and a magnet (here the magnet is the reference object). In the case of a laser range finder, one can measure the time it takes for light to leave the laser on the laser range finder, hit the surface of an object being used for the reference position, and return to the photo detector on the laser range finder. The round trip time can then be used to determine the relative distance between the laser range finder which is located on the robot and the reference object. This measurement could be performed using a series of reference objects in order to triangulate the position of the sensor relative to the reference objects.

When the soft robot is actuated (FIG. 1a, bottom portion), the soft robot bends (105') and position sensors are in different positions (101'), which information is also transmitted to the processor by wired or wireless means. Thus, the position of the soft robot can be determined based on the new positions of the position sensor and the position can be represented as a curved line set as illustrated in FIG. 1a, middle-bottom portion.

Such morphology information can be used as a data input for a finite element method (FEM) analysis (FIG. 1a, right portion). Finite element analysis (FEA) is a computerized method for predicting how a product reacts to real-world forces, vibration, heat, fluid flow, and other physical effects. Finite element analysis shows whether a product will break, wear out, or work the way it was designed. By way of example, positional data (obtained at different pressures) can be used in a finite element analysis to model strain experienced during actuation at different pressures.

Non-limiting exemplary applications of the state estimation method mentioned above include: 1) Data analysis after the fact—obtaining data to verify a FEM simulation of the part, obtaining data for evaluating the failure modes of the device, or as a data input for generating a simplified kinematic model that could later be used as part of a method for controlling the actuator in real time; and 2) Real time data analysis—the data could be used in real time for state estimation as part of a closed loop control system or it could be used in real time as part of a failsafe system that can identify an impending rupture and trigger the system to bleed pressure from the actuator before a catastrophic failure.

Strain Sensors

In some embodiments, one or more strain sensors may be integrated into or linked to a soft actuator to sense its physical state. Strain sensors don't report point positions of a soft actuator, instead, local incremental positional changes are measured as a function of strain. One can integrate the strain data provided by the strain sensor to recover positional information (FIG. 1b). FIG. 1b shows strain sensors sensing position/morphology/stress/strain states changes. As shown in FIG. 1b, an uninflated soft robot 125 has a strain limited layer 121 and an elastomeric body 127 which contains a plurality of inflatable chambers 123 connected to an outside fluid source via tube 129. In this example, the soft actuator has three strain sensors 121 embedded in the body of the soft device or attached to the surface of the elastomer body 127. When the soft robot is not actuated (125), the elastomeric body 127 will not bend and the strain sensors will provide a minimal strain reading (or no strain reading) to the computer which analyzes the strain of the relevant portions of the soft device (FIG. 1b, middle-top portion), which in turn gives an estimate on the position of the soft device's different portions. When the soft robot is actuated (125'), the elastomeric body 127 will bend and the strain sensors will experience strain (121') and thus provide higher strain readings for the computer/microprocessor to estimate the new position of the relevant portions of the soft device (FIG. 1b, middle-bottom portion). Such strain information provides basis for a finite element method (FEM) analysis (FIG. 1b, right portion).

In some embodiments, the strain sensor data sent to a processor either on the robot or external to the robot that contains a software package that can correlate the strain data with the bending, twisting, and/or extending of the actuator. This can be done by inflating the actuator to different bending, twisting, and/or extending states and recording the corresponding strain sensor readings. In this way one can generate an empirical look up table that provides the relationship between sensor readings and actuator state. Alternatively one can simulate a series of potential actuator states using a FEM. This simulation will provide a measurement of the expected strain at the points on the actuator where sensors have been placed for any given simulated state of the actuator. This data can then be used to generate a look up table that provides the relationship between the measured strain profile across the body of the actuator and the simulated state of the actuator that contains the same strain profile. In either case, if the look up table does not contain a state of the robot that corresponds to the sensor readings, the software can select a set of states from the table that contain similar readings to the measured values an perform an interpolation to estimate the current state of the robot.

In some embodiments, a single property (state variable) of the soft robot is measured by the sensor and a single degree of freedom of the soft robot can be controlled based on the readings of the sensor. For instance, as shown in FIG. 8, an actuator that has a single degree of freedom, its curvature, is measured by a large strain sensor that spans the actuator. This single data input can be used to predict the curvature of the system since each curvature state will have a unique sensor reading. Based on this reading, one may apply the right amount of pressure to get the desired actuator curvature. In other embodiments, a plurality of properties (state variables) of the soft robot are measured by the sensors and more than one degree of freedom of the soft robot can be controlled based on the readings of the sensors.

In certain embodiments, the strain sensor is a large strain sensor that spans over the entire actuator or a substantial portion of the length of the actuator, and the scalar output of the strain sensor is often an average strain. The deformation state of the actuator can be determined if the physics of the actuator is already known, and the soft actuator can be controlled by one degree of freedom (e.g., a single pneumatic soft actuator can be controlled by a scalar value of pressure input). The physics of the actuator can be used to refer to the relationship between the degree of actuator actuation and the pressure of the pressurizing fluid.

Figure 2B:
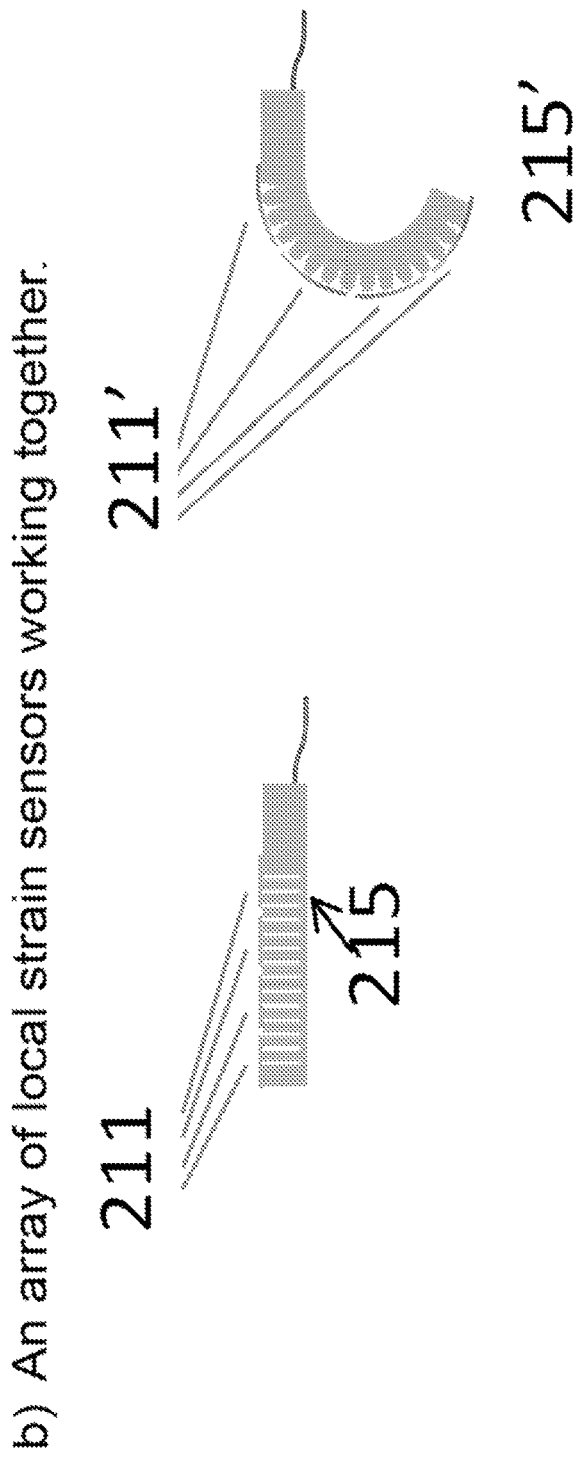
FIG. 2b illustrates an array of local strain sensors working together.

In this case, the actuator's positional information can be predicted by a single strain sensor, assuming the actuator is functioning normally (FIG. 2a). FIGS. 2a-c shows various ways to construct a strain sensing network. Specifically, a large strain sensor 201 that spans over the entire surface of the elastomer body 207 of the actuator 205 (the strain limited layer is shown as 203) can be used (FIG. 2a). The sensor will be stretched (shown as 201') once the actuator is actuated (shown as 205') and provide a strain reading. In this embodiment, a single strain value is obtained for the entire actuator which is used to determine the state (e.g., position, bending) of the soft robot.

Alternatively, an array of local strain sensors, e.g., a sensor network comprising strain sensor strips, can be embedded into the actuator. As used herein, network of sensors refer to the application of more than one sensor. These strain sensors may be designed to work together to provide strain readings on multiple locations of the actuator when the actuator is inflated to a new configuration (FIG. 2b). FIG. 2b shows a soft actuator 215 having a plurality of strain sensor 211 (with similar configuration to FIG. 1b). The sensors will be stretched (shown as 211') once the actuator is actuated (shown as 215') and provide a strain reading. In the case of small strain sensors that only sense local strain, each strain sensor only provides information on the deformation of a single point, and as a result a plurality of strain sensors are needed to achieve spatial strain information for a hole actuator or robot, especially with help from an interpolation method. The methods for interpolation are the same as mentioned for point sensors. In this configuration, the sensing network has more degrees of freedom (equal to the number of strain sensors imbedded in the soft actuator or robot). If the sensing degrees of freedom are greater than the degrees of freedom in the actuator or robot, the sensing network will have the capability to predict if the actuator or robot is functioning normally and use this data to guide its actions (FIG. 2b). Similar to point sensors, a user or a processor can process the readout from the sensor to determine the strain state of the soft actuator given the material properties of the soft actuator and the strain data from the strain sensors. Thus, one can collect the stress vs strain profile for a test sample of elastomer. The resulting data set can be used to create a look up table that correlates the relationship between the measured strain at a point on the actuator and the corresponding material stress at that point on the actuator.

There are a few stretchable soft sensors and sensor networks capable of large deformation. Embedding layers of ionic gel conductors, conductive greases, or eGaIns into the elastomer can work for this purpose. With soft conductors capable of large deformation, one can make capacitive soft strain sensors by sandwiching an isolating layer of elastomer between layers of the elastomeric or liquid conductor. Exemplary stretchable soft sensors are described in Zhigang Suo et al., described in Science 341, 984-987 (2013).

Still in further embodiments, a network of hard strain sensors 221 with serpentine connecting wires 222 can be embedded or attached to the actuator 225 (FIG. 2c). By utilizing metallic conductors patterned in stretchable geometries (e.g., serpentine or wavy patterns), one can imbed existing hard electronic strain sensors to sense small local strains, and connect these hard sensors with these stretchable metallic conductors, forming an overall compliant strain sensing network (FIG. 2c). Thus, when the soft robot is actuated and in a bended stated (225'), the hard strain sensors 221' connected by serpentine wires 222' still maintain their proper functions and provide information on the actuator's state. One example is a "foil type" strain gauge, which typically consists of a pattern of resistive foil mounted on a backing material. The strain gauge operates on the principle that as the foil is subjected to stress, the resistance of the foil changes in a known way.

In other embodiments, the soft strain sensors are made by using embedded channels filled with conductive liquids (such as liquid metal eutectic gallium-indium (eGaIn) as, ionic liquids or carbon greases) into an elastomer. The fluidic channels change shape when the sensor is under strain, thus deforming the conductive liquid within. Due to a constant resistivity of the conductive liquid, the resistance of the liquid filled channel will change as the shape of the channel is altered, producing a signal. These are not the only possible ways to make a soft strain sensor or stretchable sensor network. Any stretchable strain sensor or stretchable sensor network capable of large deformation can serve as a strain sensing system for a soft actuator.

In other embodiments, different types of strain sensors, sensor networks, or sensor systems may be used in the strain limited layer of a soft actuator. Because the strain limited layer undergoes limited deformation during actuation, the suitable sensors used may be more rigid and less flexible. In these embodiments, the sensor(s) can be embedded or integrated in the strain limited layer or attached or linked to the strain limited layer. As described herein, in one or more embodiments, the strain limited layer is stiffer or less stretchable than the elastomeric body and more than about 10%, 20%, >50%, >100%, or >500% stiffer than the elastomeric body.

Magnetic Sensors

Sensors that detect the physical state of a soft actuator are not limited to point position sensors and strain sensors. In other embodiments, other sensors can serve as physical state indicators for soft actuators that can be either discretely embedded/attached that interact with each other, or continuously embedded/attached that are able to deform (such as soft strain sensors). In one embodiment, magnetic sensors are used in conjunction with multiple electro-magnets, which act as active markers and are imbedded in the soft actuator in tandem (FIGS. 3a-b). In certain embodiments, the system is split in that the magnets could be on the actuator and the magnetic sensors could be in the surrounding environment or vice versa. For a magnetic sensing system one could calculate the position and orientation of a magnetic marker by measuring the relative magnetic flux through a collection of field coils in the surrounding environment. In certain embodiments, these coils could also be in the actuator along with the magnets. The relative intensity of the voltage or current of the coils could allow such a system to calculate both the position and orientation of the magnetic marker. Also, each electromagnetic markers placed on the soft actuator could be designed to emit magnetic pulses. As a result if the magnetic markers along the body of a soft actuator emitted there magnetic pulses in a timed sequence it would be possible for the magnetic sensing system to distinguish between markers and therefore assign each signal in the sequence to points along the actuator.

FIGS. 3a-b shows a magnetic sensing network for soft actuators. Thus, as shown in FIG. 3a, a soft robot 301 has three magnetic sensors (300A, 300B, and 300C) attached to its surface. During actuation, the soft robot is in a bended state (301') and the magnetic sensors are in different locations (shown as 300A', 300B', and 300C'). The magnetic field readings of these magnetic sensors will be recorded by a receiver and transmitted to and analyzed by a computer/processor (FIG. 3a). Alternatively if each sensor of 300A, 300B, and 300C along the body of the soft actuator 301 emitted a magnetic pulse at a unique frequency it would be possible for a magnetic sensing system or a processor to measure the signals from all of the sensors simultaneously by performing a Fourier transform on the time dependent signal measured by the network of field coils (FIG. 3b). In either case the sensors could be connected to a computer/processor through a receiver that converts this data into a real time position and morphology map of the actuator in the three dimensional space. Since each emitter emits a signal at a different frequency the resulting time dependent field measurement is a complicated signal resulting from the interference of all of the individual emitter signals. None the less since a Fourier transform can convert this complex time dependent signal into a power spectrum plot of the signal it is easy to distinguish the measured intensity coming from different emitters on the robot. For a given signal, the power spectrum gives a plot of the portion of a signal's power (energy per unit time) falling within given frequency bins. Since each frequency corresponds to a specific emitter on the robot this power spectrum is actually a plot of signal power for each position on the robot. Next, since the power for a given position is proportional to the distance between that positions emitter and the receiver this power spectrum can be used determine the distance between the receiver and each emitter on the robot.

Pressure Sensors

Figure 4A:
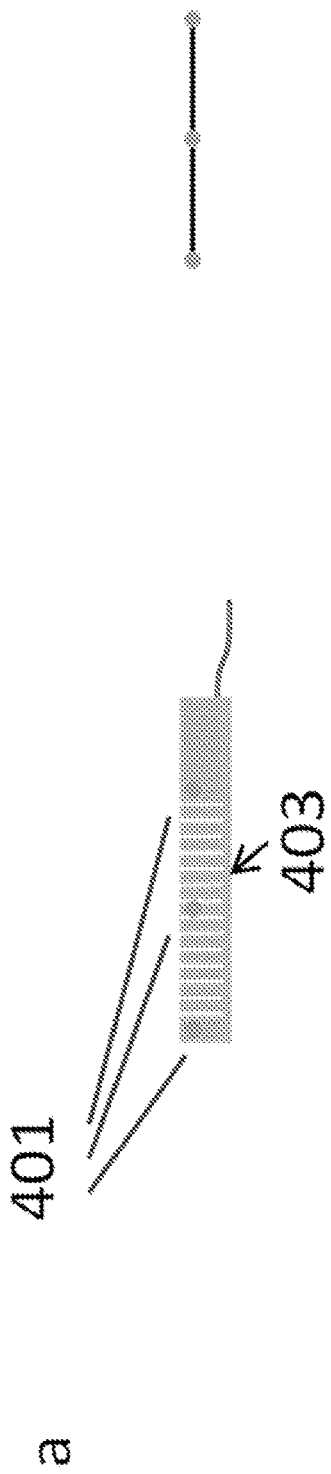
FIG. 4a shows an internal pressure sensing network for a soft actuator in the unactuated state.
Figure 4B:
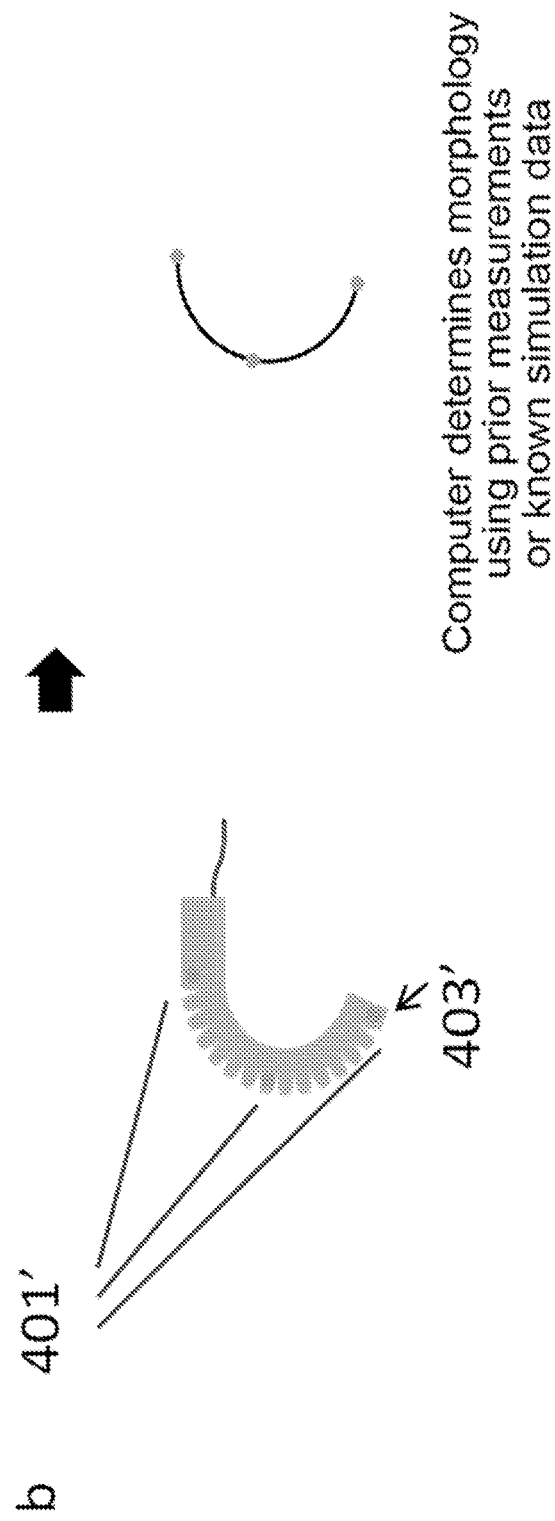
FIG. 4b shows an internal pressure sensing network for a soft actuator in the actuated state according to according to one or more embodiments.

Another alternative for determining the state of a soft actuator or soft robot is to use a network of pressure sensors that are connected to or embedded in each pneumatic chamber of a multi-chambered soft robot (FIGS. 4a-b). The soft actuator 403 has embedded pressure sensors 401 and a plurality of pneumatic chambers. The sensor 401 may be embedded in the pneumatic chambers (not shown) and thus provide information of the pressures inside the pneumatic chambers. The sensor may be used to provide information on the pressures inside the pneumatic chambers when the soft actuator is unactuated (FIG. 4*a*, 403); and when the soft actuator is actuated (shown as 403' in FIG. 4*b*, the sensors are shown as sensor 401'). In either case, the pressure readout from the sensors may be linked/fed to a computer system/processor to correlate the pressure information with the morphology of the soft actuator (e.g., by using prior measurements of known simulation data). Thus, by knowing the pressure of each chamber one can determine the morphology of a soft actuator or soft robot by performing an FEA analysis or by using an empirically derived look up table that contains each chambers degree of actuation as a function of pressure. In some embodiments, the information obtained by the pressure sensors are further transmitted to a controller system which is configured to adjust the fluid inflation pressure based on the readout from the sensor.

One important application for performing real time measurements of a soft device's morphology is to compensate for hysteresis in the inflation behavior of the device. For example when a soft actuator is inflated to a given pressure Y followed by being inflated to a new pressure X, where X>Y, and then inflated again to a pressure of Y it is sometimes observed, depending on conditions, that a larger degree of actuation occurs on the second inflation to Y. For systems where this hysteresis effect is prominent, knowing the pressure supplied to a soft device is insufficient for determining its morphology. In these cases a network of sensors or markers (e.g. strain sensors, magnetic markers, LED markers, etc.) that aid in the measurement of parameters that are independent of pressure could be used to determine the morphology of a soft actuator or robot. Such a system of sensors could be used to guarantee that the desired morphology of a soft device is achieved regardless of the device's memory of past inflations.

Force Sensors

In some embodiments, the soft robotic device is a soft gripper. In some embodiments, the soft robotic device, e.g., a soft gripper, includes a force sensor used for state estimation of the soft device/robot. As described herein, if a soft actuator is making contact with an object, knowing the pressure and the volume of air used to inflate the actuator may not be enough information to know the actuators morphology. In this case one could use data on the inflation pressure and the volume of air used to inflate the actuator in conjunction with readings from force sensors on the surface of the actuator to determine the actuators morphology. This combination of pressure, air flow, and force information will be important for controlling a soft robotic gripper.

At present it is considered challenging to build a gripper (or end effector) for the manipulation of delicate objects. This is in part due to the use in conventional grippers of materials such as metals and plastics for constructing fingers. These materials are not compliant which results in minimal contact area between the fingers and the object being gripped generating points of large force concentration that can damage the object. One way to circumvent this problem is to build a highly articulated finger, allowing the finger to come in conformal contact with an object, and embedding sensors in the finger so a computer can stop the finger before one of its hard sections applies excessive force to an object. Such a strategy is effective but is also problematic because it also makes the gripper more complicated and expensive. Soft grippers are better suited for the manipulation of delicate objects because they are made from soft materials. Nevertheless under some circumstances even a soft gripper could apply excessive force to a delicate object. As a result it is useful to integrate force sensors into a soft gripper that could be used in conjunction with a control system that prevents the application of force to an object from rising above a set threshold force. In certain embodiments, the control system is configured to adjust the fluid inflation pressure, hence the stiffness of the soft body and the gripping pressure, based on the pressure readout from the sensor. The sensitivity of the force sensor is variable and can be designed to detect forces with a range of magnitude. In certain embodiments, the force data could be used as part of a feedback system allowing for the creation of custom gripping profiles for the gripper. The acceptable force profiles for a wide range of objects are known in the art for which the same soft gripper could be used to manipulate multiple kinds of objects. For example, one may use the soft gripper described herein to manipulate a tomato, a piece of fish, and a carton of milk for packing a shopping bag at a grocery store. In surgery, one may use the soft robotic gripper described herein, e.g., a retractor, to retract intestines, muscle, and fascia.

Figure 9:
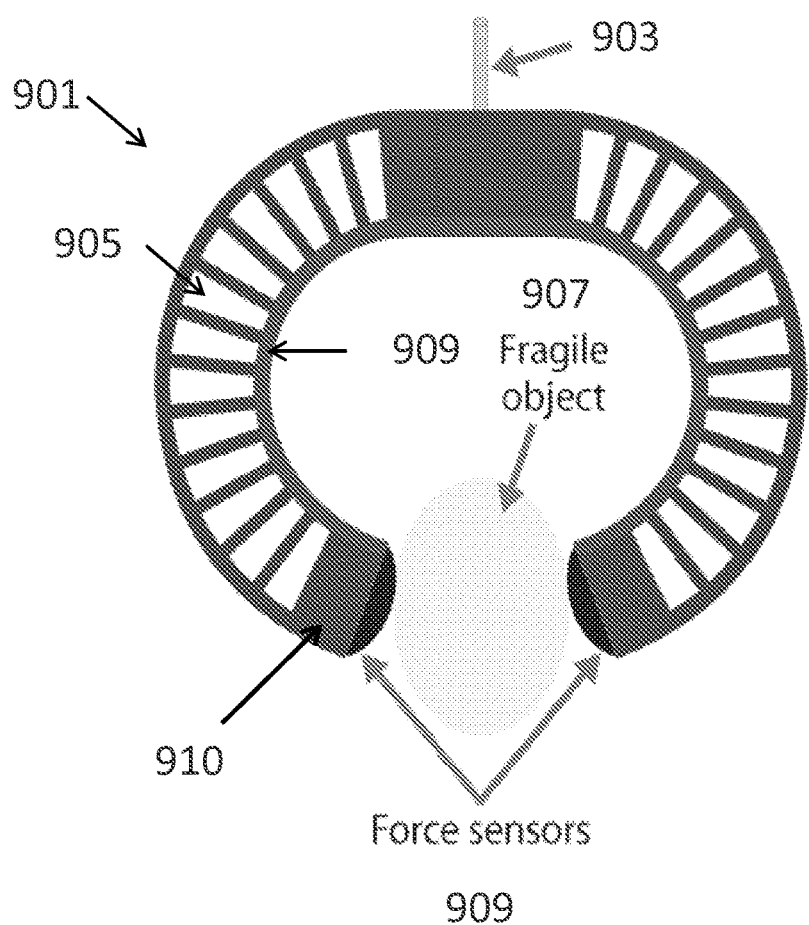
FIG. 9 is an illustration of a soft gripper with integrated force sensors according to one or more embodiments.

FIG. 9 illustrates a soft gripper 901 with integrated force sensors. The gripper 901 includes a soft elastomeric body 910 containing a plurality of chambers 905 connected to a fluid source via an inlet 903, a strain limited layer 909, and two force sensors 909 for sensing the force used to grip a fragile object 907. In certain embodiments, these force sensors could be used in conjunction with a motion controller to ensure excessive force is never applied to an object being gripped thereby preventing damage to the object. For instance, the controller may be used to control the amount of the fluid used to inflate the chambers 905 and thereby control the force used to grip the object.

In other embodiments, the force sensors can be used for "grasp detection" on the soft robot. Specifically, one or more force sensors can be included on the fingers of a soft robotic hand and to tell whether the fingers have come in contact with the object it is trying to grasp as opposed to just curling around empty space and therefore grabbing nothing at all. This type of detection is very important since if one does not have the object in the grasp, one cannot move forward and do something with that object.

Several exemplary ways of creating a force sensor for a soft robot are described below:

1): One may cast a conventional barometric pressure sensor into the elastomer at the tip of a soft finger. Robert D. Howe and coworkers showed that a barometric pressure sensor, which normally measures air pressure, may be made into an embedded sensor that can measure applied force to a block of elastomer. See, e.g., "The Feel of MEMS Barometers: Inexpensive and Easily Customized Tactile Array Sensors," Robotics & Automation Magazine, IEEE (Volume: 21, Issue: 3, Page: 89-95, Year 2014). In these embodiments, the sensor can be placed in uncured elastomer and vacuum degassed so that the air inside the sensor is replaced with the uncured elastomer. Next the sensor is embedded into the elastomer on the surface of a soft finger that is meant to contact objects.

2): One may cast a soft capacitor into the tip of a soft finger and use this capacitor as an applied pressure sensor. Soft capacitors have been previously made by Zhigang Suo at Harvard SEAS, which we mentioned earlier in this filing in the section on soft strain sensors. The capacitor was made by sandwiching an isolating layer of elastomer, which acts as a dielectric layer, between layers of an elastomeric conductor. In this case instead of using the soft capacitor as a strain sensor by elongating it we would use it as a pressure sensor by compressing it. Compression would thin the electrically isolating layer of elastomer between the two layers of the elastomeric conductor there by generating a measurable change in capacitance.

3): In other embodiments, "Force-Sensing Resistors" (see en.wikipedia.org/wiki/Force-sensing_resistor), typically sold as minimally extensible thin sheet devices, may be used. One can attach an FSR to the strain limiting layer or the elastomeric body of a soft actuator. The FSR could be attached to the strain limiting layer with glue, over-molded to the strain limiting layer, attached to a fabric (or "engineered textile") that is then placed on the actuator, or since the FSR is only minimally extensible it could serve a dual role as the actuators strain limiting layer and a sensor. As long as the FSR is located at the neutral bending plain of the strain limiting layer, the fact that the FSR is only minimally extensible should not impede the operation of the actuator. Further details about the integration of flexible electronics with soft robots are described in U.S. Provisional Application 62/040,905, the entire content of which is expressly uncorrupted by reference.

4): In still other embodiments, a soft force-sensing resistor is described. A fluidic channel filled with a conductive liquid like carbon grease could be embedded into the tip of a soft finger and when a point along the channel is compressed the channel will thin in that area creating a change in the measured end to end resistance of the channel.

Inertial Measurement Units as Sensors

In some embodiments, one or more Inertial Measurement Units (IMUs) could be used to measure the state of a soft actuator or soft robot. An IMU is an electronic device, which uses a combination of accelerometers, gyroscopes & magnetometers to predict the location & orientation of the device in 3D space. In one example, an IMU at or near the tip of an actuator could provide information about the angle and orientation of the actuator tip relative to its starting position. Since the dimensions of the actuator and placement of the IMU on the device are known (e.g. the distance from the base to the tip IMU), the state of the actuator could be inferred from IMU data.

By knowing data such as the initial position, velocity, and orientation of an IMU, one can use the IMU's sensor reading such as its measurements of acceleration, which comes from the IMUs accelerometer, and its measurements of orientation, which comes from the IMUs gyroscope, to approximate its state at some time later. This process is known as dead-reckoning. It should be noted that due to potential inaccuracies in the IMUs readings its predictions of the current state of the IMU will become increasingly inaccurate as the time since the IMU was in a known state increases. As a result it is common for systems that use dead-reckoning to periodically enter a known state to provide a new calibration point for the dead-reckoning algorithm. In the case of a soft actuator, one can use the state of the actuator when it is uninflated as its calibration point and only collect data for state estimation during a cycle of actuation. This will dramatically improve the quality of state estimation that can be accomplished with the IMU.

Figure 10:
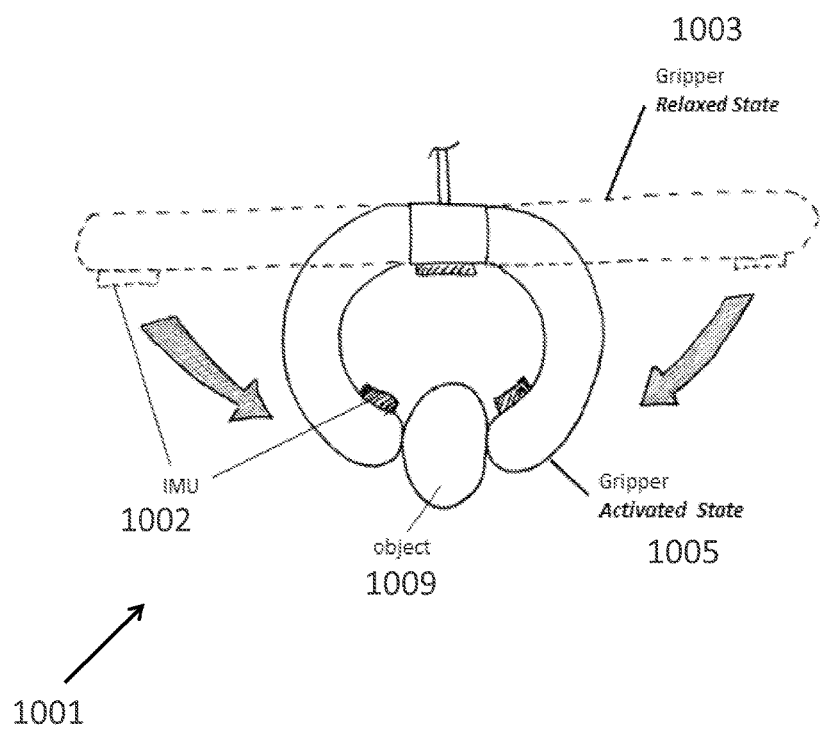
FIG. 10 is an illustration of a side view of a gripper with inertial measurement units (IMUs) that are used to estimate the state of the gripper according to one or more embodiments.

Thus, as shown in FIG. 10, a soft robotic device, e.g., a gripper 1001, contains two IMUs 1002 attached to the surface of the device. In its relaxed unactuated state 1003 (dotted line), the gripper does not make contact with the object 1009. When the gripper is in its actuated state 1005 (solid line), the body of the gripper moves in the direction of the arrows and grip the object 1009. The data from the tip IMU when a soft gripper is curled will be very different from the data from the tip IMU when the soft gripper is in its rest state (FIG. 10).

The IMU data can also be used to infer information about the object being grasped or if the actuator is malfunctioning. For example, an unimpeded soft actuator has a very predictable motion path for a given input pressure, which the IMU can record. Deviations from the expected motion path at given pressures could be used to infer the size/shape of the object impeding the motion of the actuator and the force that is being applied to the object. Furthermore, if an unimpeded actuator produces an unexpected motion path as measured by the IMU, this would indicate to the controller and operator that the actuator is malfunctioning.

When an actuator is pressurized in free space there is a well-known relationship between actuation pressure an actuator curvature. If an object gets in the way of the path of the actuator the actuator will not be able to complete its curving motion and instead will press up against the object in its path. If one had a gripper with multiple fingers that could envelope an object and all of those fingers had IMUs so one could determine the shape of each actuator, one can treat the collection of IMU position readings as measurements of the outer profile of the object being grasped. If the IMUs on the actuator show that the actuator is moving through an irregular path during a cycle of actuation but the force sensors embedded in the fingers are not measuring a change in finger force application this would mean that the change in path is not due to the fingers making contact with an object. It is more likely that there was a change in the finger itself and potentially this change could be a sign of finger failure. For example popped fingers will still actuate when pressurized but the degree of actuation will be small relative to an unpoped finger. As a result if one pressurizes a robotic finger and it is bending to only half of what is expected, then the finger is either bumping into and object or it has a pop.

Figure 11:
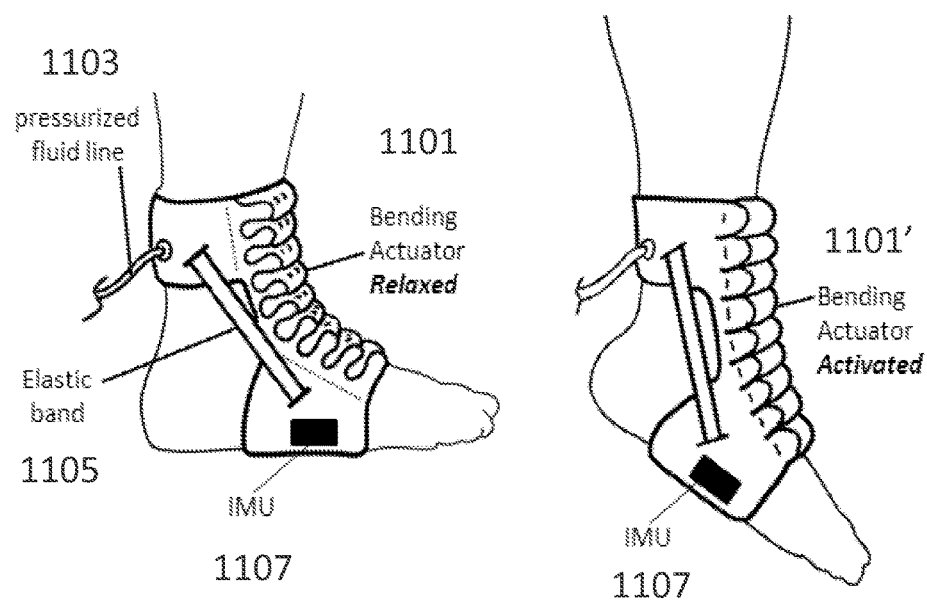
FIG. 11 presents a perspective view of a soft actuator device supporting/driving ankle flexion and extension with IMU/IMU's according to one or more embodiments.

IMU's have also proven useful for measuring biomechanical kinematics without the need for external motion capture equipment. The combination of IMU's and soft actuators could be used in rehabilitative and assistive applications. For example, as shown in FIG. 11, a soft actuator 1101 applied to a joint such as a knee can be used to carry out continuous passive motion exercises for someone recovering from joint surgery or from an injury. The actuator 1101 contains a pressurized fluid line 1103 connected to its chambers, an elastic band 1105, and an IMU 1107. One or more IMUs 1107 could be placed on or around the joint to track the motion generated by the soft actuator and the controller can use this data to set limits on the range of motion produced for the soft actuator (FIG. 11, with the left portion of the figure showing the actuator in a relaxed state 1101 and the right portion of the figure showing the actuator in the actuated state 1101'). It should be noted that the same concept could be applied to all the joints including ankles, shoulders, elbows, wrists, fingers, neck, hip, toes, and so forth. Furthermore, for joints that have multiple degrees of freedom such as the ankle, hip, shoulder, wrist, multiple actuators would be required to support these ranges of motion and this can still be captured by one or more IMU's.

As used herein, Continuous passive motion (CPM) devices refer to devices used during the first phase of rehabilitation following a soft tissue surgical procedure or trauma. The goals of phase 1 rehabilitation are: control post-operative pain, reduce inflammation, provide passive motion in a specific plane of movement, and protect the healing repair or tissue. CPM is carried out by a CPM device, which constantly moves the joint through a controlled range of motion; the exact range is dependent upon the joint, but in most cases the range of motion is increased over time." For a soft robotic CPM device described herein, one could use soft actuators to perform the job of constantly moving the joint. Since controlling the range of motion of the joint during the rehab exercise is crucial, one can use IMU's mounted on the robot to track the joint motion to make sure the soft actuators are not moving the joint outside of the desired range of motion. Again since IMUs need periodic recalibration in order to maintain the accuracy of a dead-reckoning state prediction, one will need to define a point in the range of motion as the calibration point. To do this, one can place one IMU on either side of the joint so that the fully open state or fully closed state of the joint could be used as the calibration point since it would be easy for a patient to reproduce these positions and as a result it would be easy to reproduce the relative distance between the IMUs. If these joint positions are outside the desired range of motion for the treatment in question, one could build an external fixture that would place the joint at a known angle before each calibration step.

In certain embodiments, a soft robotic system containing a soft robot including one or more IMUs and a control system is described. IMU motion data can also be used to inform the control system when to activate a soft actuator. This could be useful for patients that are able to initiate a motion, but struggle to complete the motion task. In this scenario, the IMU and the controller could detect when a user reaches the limits of his active range of motion and command a wearable soft actuated device to provide assistive forces to complete the motion task. Thus, by using the processor to monitor one or more sensor readout (e.g., the position of the soft robot), one may estimate or assess the state of the soft robot.

Temperature Sensors (Thermal Sensors)

In some embodiments, a soft robot or soft actuator with one or more temperature sensors is described. The temperature sensor may be embedded in the strain limiting layer or the pneumatic layer of the soft robot or soft actuator. In other embodiments, the temperature sensor may be attached to the surface of the strain limiting layer or the pneumatic layer of the soft robot or soft actuator. In certain embodiments, the temperature sensor is included inside the pneumatic layer to measure the temperature of the gas or fluid inside the pneumatic layer.

Any temperature sensor known in the art can be used. Non-limiting examples of temperature sensors include thermistors, resistive temperature detectors, and thermocouples.

The mechanical properties of an elastomeric material, such as stiffness, are strongly correlated with temperature. Changes in temperature can reversibly or permanently alter the physical behavior of soft actuators. A temperature sensor, embedded in or attached to the soft actuator, can detect changes in the working temperature of the elastomeric materials used in the construction of the actuator and a microprocessor based control system can make adjustments to the fluid pressures used to actuate the actuator to compensate for the changes in the mechanical properties of the elastomers. For example since the stiffness of elastomers change with temperature, a soft actuator will require a different inflation pressure to achieve a given actuated shape at different temperatures. In certain embodiments, a control system is designed to use temperature data in order to assure that a soft actuator inflates to the same shape regardless of its temperature by modulating the actuation pressure as needed.

Figure 12:
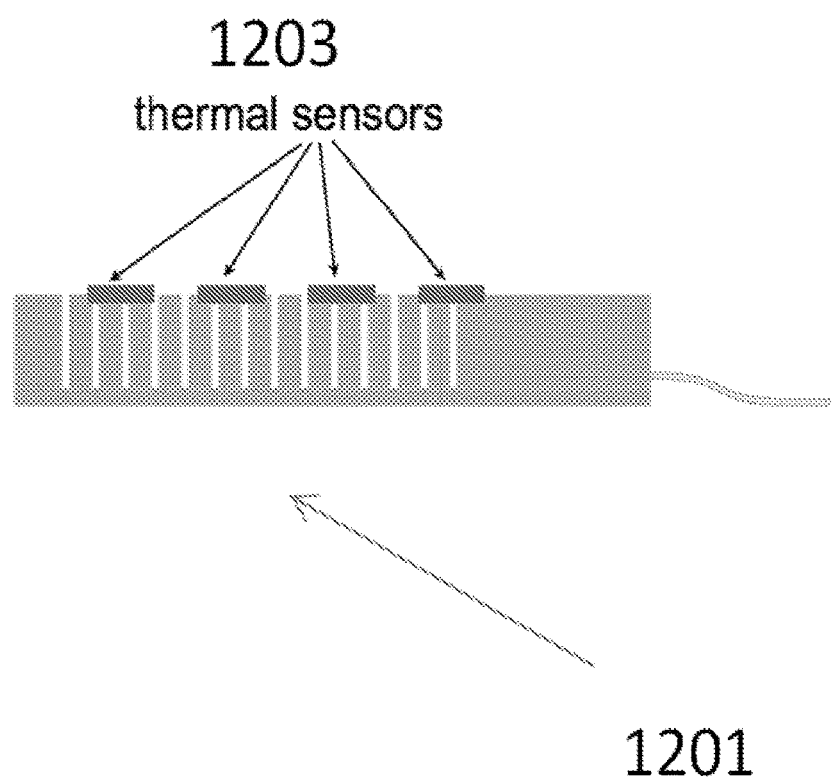
FIG. 12 is a schematic of a soft robot with a thermal sensor according to one or more embodiments.

In certain embodiments, one may measure the temperature inside the actuator to determine if the temperature is outside of the safe working range of the elastomers that make up the actuator thereby triggering the shutdown of the robotic system. For example if the temperature of the actuator goes below a certain threshold (typically below −100 C for silicones) the elastomer will become embrittled. As a result inflating the actuator could result in the rupture of the actuator destroying the robot. Shown in FIG. 12 is a soft robot 1201 including a plurality of thermal sensors 1203.

Since the surface of a soft actuator strains during actuation the relative distance between sensors will not remain fixed. This change in the relative distance between sensors in the network will complicate the determination of the direction of a signal of interest if one intends to use a method that relies on analyzing the gradient in signal intensity across the distributed sensor array. To minimize this issue, in certain embodiments, a spatially distributed network of sensors could be applied to the strain limiting layer (e.g., embedded in or attached to the surface of the strain limiting layer) of a soft robot since the strain limiting layer is the section of the soft robot that experiences the least strain during actuation.

Volumetric Sensors

In some embodiments, a soft robot or soft actuator with one or more volumetric sensors is described. The volumetric sensors may be embedded in the chamber of the soft robot or soft actuator and are configured to measure the volume of the fluid flowing into the chamber. In other embodiments, the soft robot or soft actuator is part of a soft robotic system which comprises at least one of a processor and a control system. The processor is configured to receive the data readout from the volumetric sensor. Based on the interpretation of the readout, the processor may send instructions to the control system to reduce or stop more volume of the fluid from going into the chamber. Therefore, the readout from the volumetric sensor may serve as an indicator for the pressurization state of the chamber of the soft robot.

Soft Robot Capable of Gripping (a Soft Hand)

In one or more embodiments, electronic soft robots capable of actuation can be prepared by using a molding process. An extensible elastomeric material is cast in a mold to generate a flexible and stretchable pneumatic, hydraulic, or vacuum actuated network. The network is backed on one side with an inextensible or minimally extensible strain limited layer that incorporates electronic components into the strain limiting layer. In some embodiments, the strain limited layer is stiffer or less stretchable than the elastomeric body and more than 10%, 20%, >50%, >100%, or >500% stiffer than the elastomeric body or in any range bounded by any of the values noted herein).

In one or more embodiments, the electronic component includes a strain sensor that allows monitoring of strain experienced by the soft robot during actuation. For example, an electronic soft robot can include a robot having actuators that mimic the motion of a human hand and the soft robot can be equipped with strain sensors that measure the curvature of the actuators during actuation.

One promising application of soft robotics is the creation of a soft robotic hand for the purpose of creating a soft prosthesis or a hand for a collaborative robot. A soft hand is integrated with electronic sensors to create a hand that can sense its interaction with the objects it is gripping.

Figure 5A:
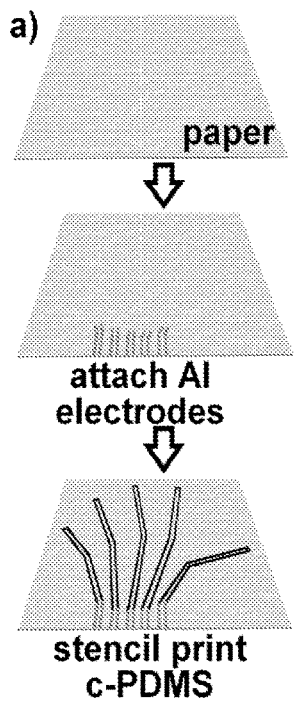
FIG. 5a shows a sheet of blended polyester/cellulose paper dressed with adhered aluminum electrodes and stencil-printed c-PDMS sensors to make a paper based flexible electronic.
Figure 5B:
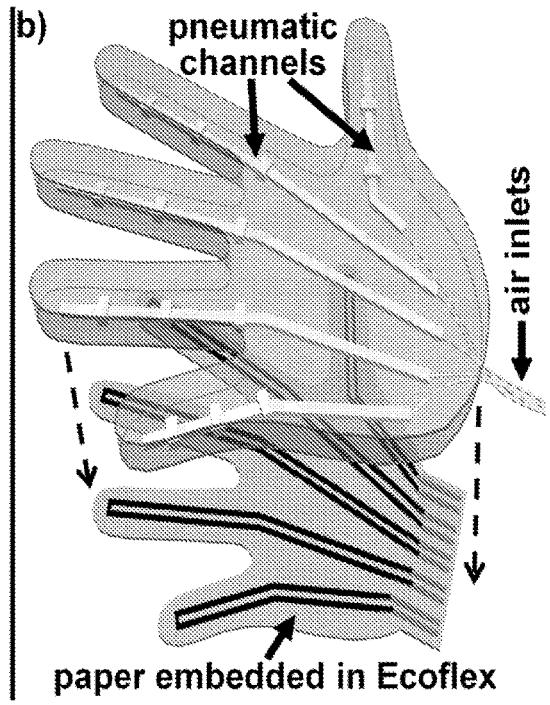
FIG. 5b shows that the Ecoflex pneumatic layer is placed in contact with the flexible electronic which is soaked with uncured elastomer and finally, the assembly is thermally cured.

FIGS. 5a and 5b illustrate the procedure used to fabricate the soft, pneumatic hand-gripper with embedded curvature sensors. Soft lithography was used to fabricate the pneumatic actuating layer by casting Ecoflex silicone prepolymer in a plastic mold generated by three-dimensional printing. The strain sensor was a piezo-resistive strain sensor on a sheet of polyester/cellulosic blend paper. The flexible electronic strain-limiting layer containing the piezo-resistive sensors was prepared using a three-step process as illustrated in FIG. 5a. First, aluminum electrodes were attached to a sheet of paper with adhesive tape. Next, a stencil mask was used to print curvature sensors made of a mixture of carbon black and a polydimethylsiloxane polymer, sylgard 184 (c-PDMS) which were partially overlapping the aluminum electrodes. The c-PDMS lines were cured at 100° C. for 10 min. Finally, the assembly of the hand actuator was completed by placing the Ecoflex polymer actuating layer on top of the paper based flexible electronic strain-limiting layer using Ecoflex prepolymer to bond the two parts. The entire paper received a thin coat of Ecoflex silicone prepolymer in order to transform the paper into an air tight composite. After curing the ensemble at 60° C. for 1 h, the excess paper and polymer were trimmed with scissors.

Figure 6A:
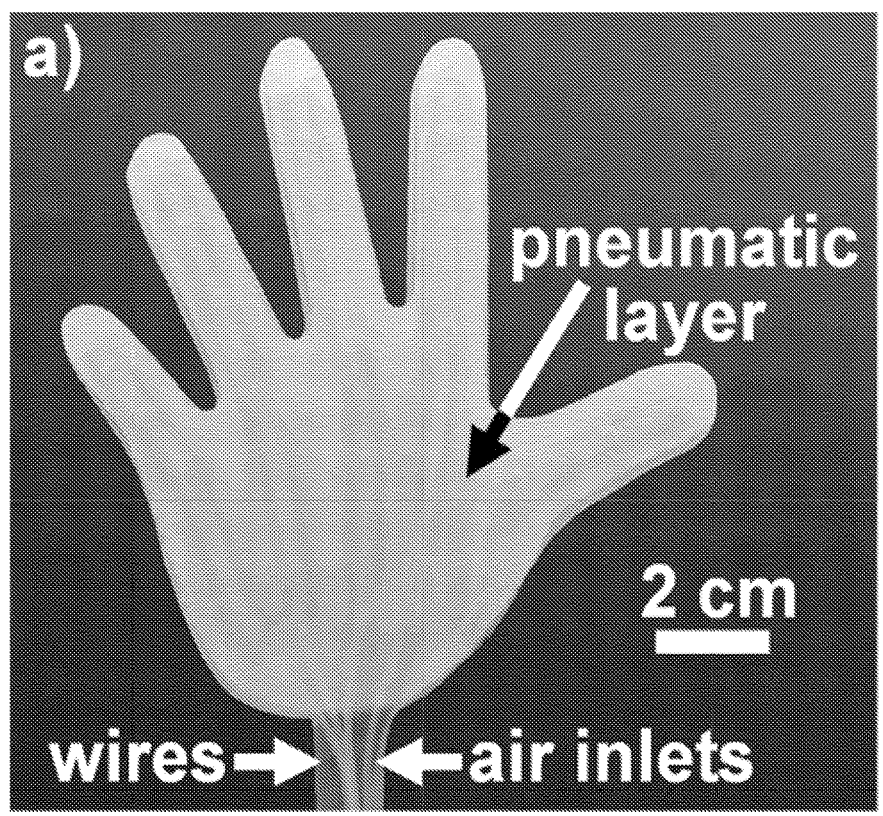
FIG. 6a shows a top-view of a hand-like soft robotic gripper.
Figure 6B:
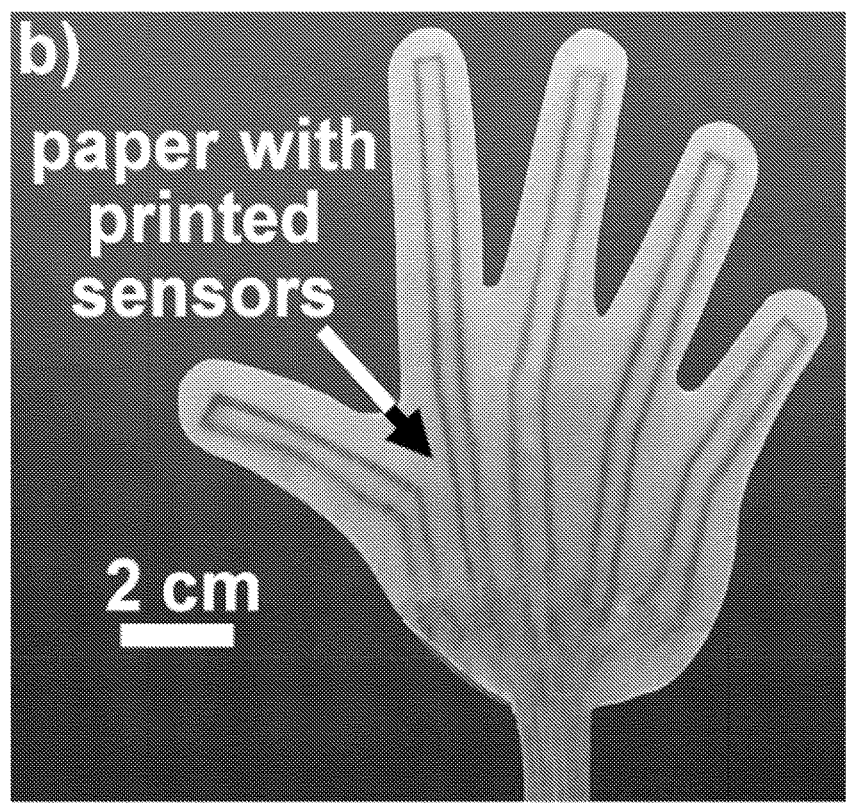
FIG. 6b shows a bottom-view of the same device.
Figures 6C, 6D:
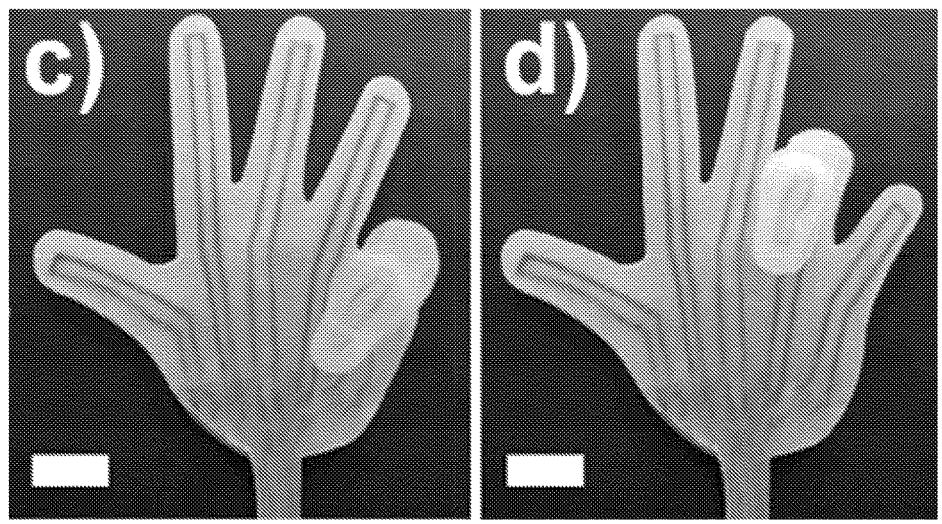
Figure 6H:
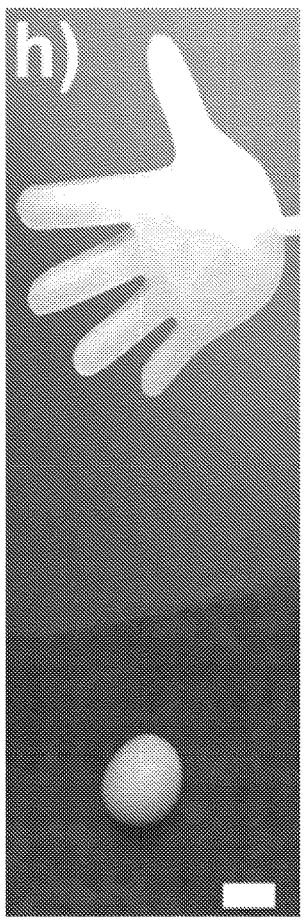
FIGS. 6h, 6i, 6j, 6k, 6l, 6m shows photographs of the manipulator picking up an uncooked egg.
Figure 6I:
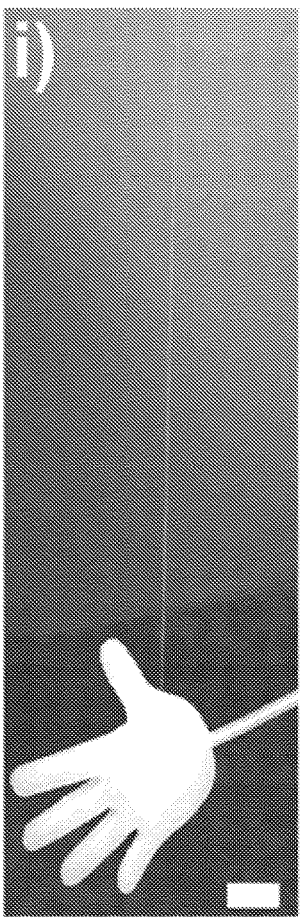
Figure 6J:
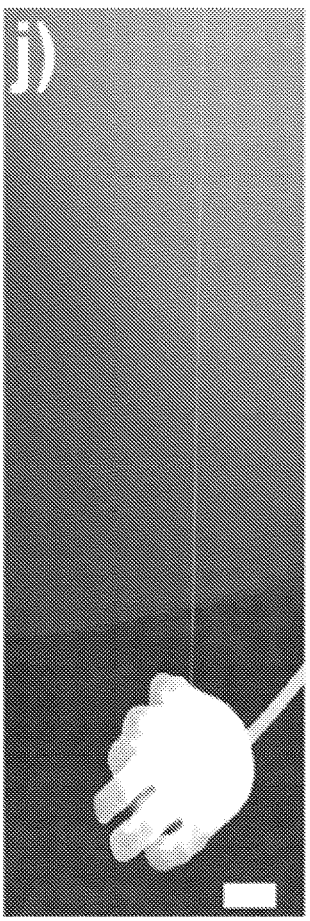
Figures 6K, 6L, 6M:
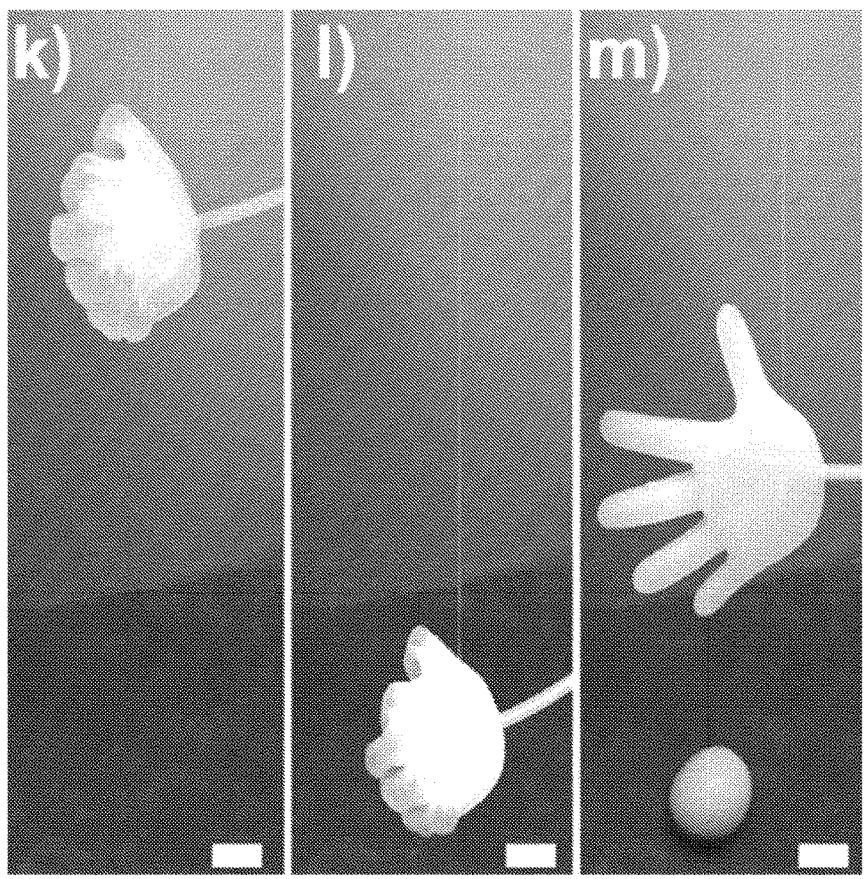

The operation of the hand is shown in FIG. 6a-6m. FIG. 6a is a top-view photograph of the hand-like soft robot showing the pneumatic networks in the extensible elastomeric layer. FIG. 6b is a bottom-view photograph of the hand-like soft robot showing the strain limited layer with printed piezo-resistive sensors. The finger actuators can be operated independently, or in concert, to effect motions typical of the human hand. FIGS. 6h-6m, for example, demonstrate the ability of the hand-like soft robot to pick up a chicken egg.

The piezo-resistive c-PDMS sensors printed on the strain limiting layer of the gripper allow sensing of the curvature of each finger during operation. When a finger of the gripper bends upon pressurization its curvature sensor stretches. This stretching decreases the connectivity of the sensor's percolation network thus increasing its resistance. The paper in the strain limiting layer is near the neutral plain of bending (the neutral plane is the surface within a beam where the material of the beam is not under stress). Since the sensors are printed above the neutral plane of bending on the side of the paper that is facing the less extensible layer they experience extensional force during actuation. If they were printed on the opposite side the sensors would experience compressive force during actuation causing the resistance of the sensor to go down. After releasing the pressure of the pneumatic channels the c-PDMS sensors fully recover their original shape and electric resistance. The resistance of the strain sensors can be monitored and correlated to the amount of curvature experienced by each finger actuator. Each of the finger actuators can be monitored separately. FIGS. 7a-7e are resistance vs. curvature plots (plotted with square data points) for each of the finger actuators of the hand-like soft actuator. This is an example of an electronic component on a strain limited layer that is capable of withstanding moderate strains. Indeed, the moderate strain is used for its sensing capability.

An attribute of the electronic soft robots is that the electronic circuitry can be robust and resistant to malfunction when strained or crushed. This feature is attractive in many applications, where the robot is intended to operate under hazardous conditions or in situations without direct human supervision. FIGS. 7a-7e show the performance of the flexible electronic is unaltered following repeated impacts with a hammer (data plotted with circle data points). As a result, these flexible electronics can survive some of the demanding environments in which soft actuators will be used.

Figure 8A:
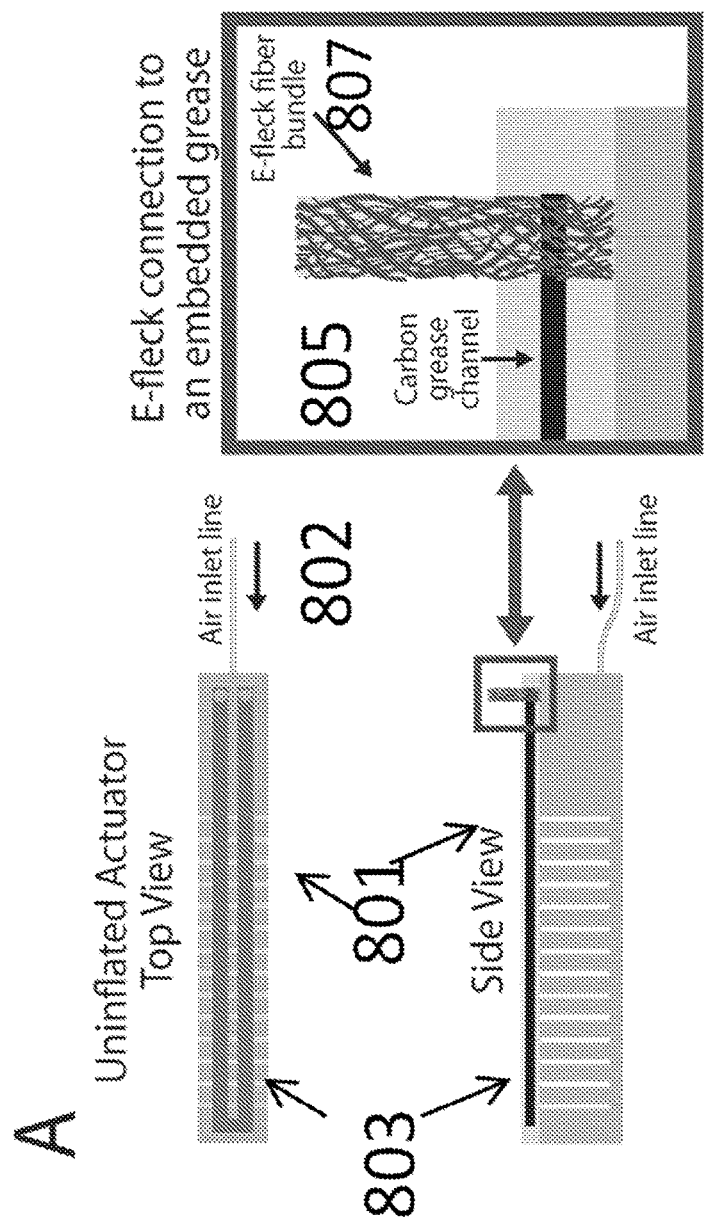
FIG. 8a is an illustration of a soft actuator with an adhered soft strain sensor made from an elastomer, a carbon grease resistor, and steel wool electrical leads referred to as E-flecks.

In some embodiments, the sensor itself is flexible and stretchable ("soft") and thus can bend and stretch as the soft robot bends and still maintain its proper sensing function within the soft robotic device's actuation range. In certain embodiments, a soft actuator with adhered soft strain sensor is described with reference to FIGS. 8a-d. FIG. 8a illustrates a soft actuator with an adhered soft strain sensor made from an elastomer, a carbon grease resistor, and steel wool electrical leads referred to here as E-flecks. The top portion of FIG. 8a shows a soft actuator 801 with an air inlet line 802 and a soft strain sensor 803 attached to the top surface of the elastomeric body of the soft robot. The bottom portion of FIG. 8b shows the side view of the same actuator 801, including an enlarged portion of the sensor 803, made from an elastomer encapsulated carbon grease resistor 805, and steel wool electrical leads referred to here as E-flecks (807).

Figure 8B:
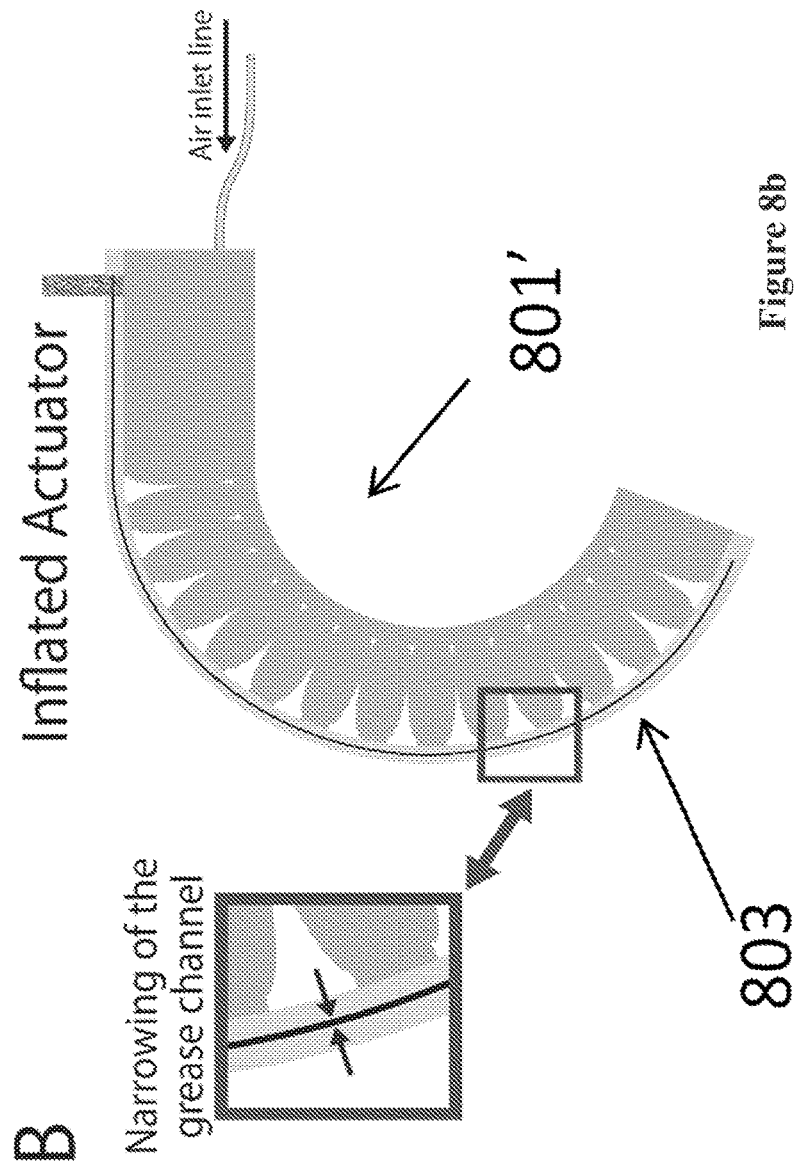
FIG. 8b is an illustration showing the thinning and elongation of the carbon grease channel upon inflation of the soft actuator.
Figure 8C:
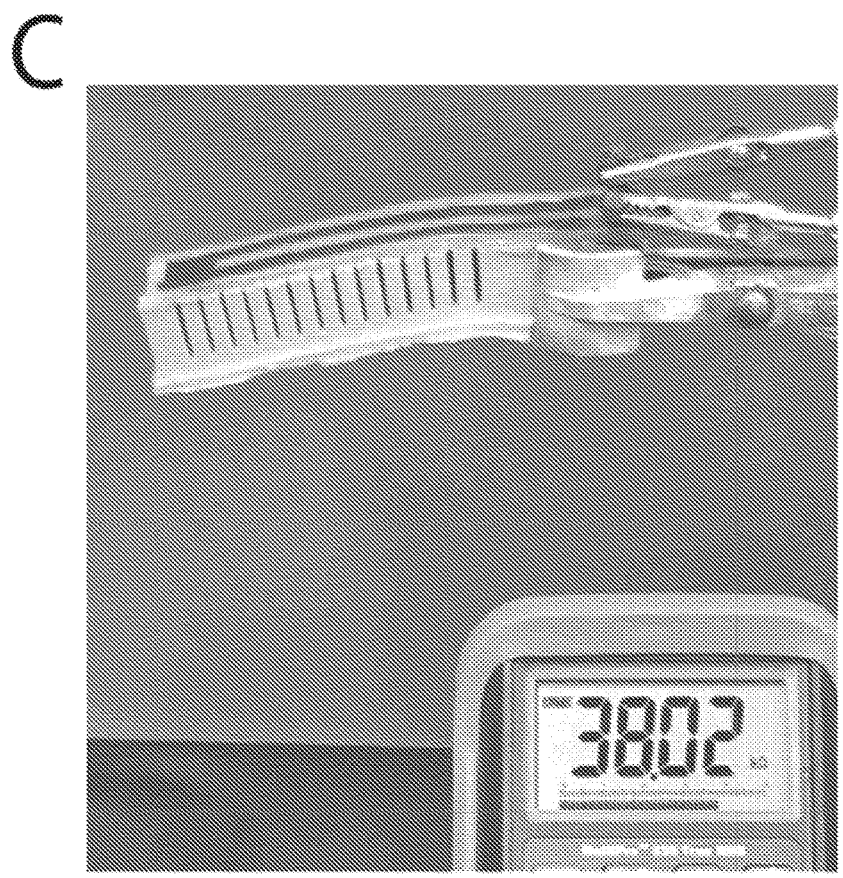
FIG. 8c is a photograph of the soft device in its uninflated state.
Figure 8D:
FIG. 8d is a photograph of the soft device in its inflated state as indicated by the increase in resistance shown on the screen in the lower right side of the image.

FIG. 8b illustrates the thinning and elongation of the carbon grease channel in the sensor 803 upon inflation of the soft actuator (shown as a bended soft actuator 801'). FIG. 8c shows a photograph of the soft device 801 in its uninflated state with a resistance measurement of 38.0 kΩ. FIG. 8d shows a photograph of the soft device 801 in its inflated state as indicated by the increase in resistance (now 91.2 kΩ) shown on the screen in the lower right side of the image. Thus, the resistance readout from the sensors may be processed/fed to a processor which correlates the resistance of the sensor with the strain state and/or curvature of the body of the soft robot.

Soft Robotic Systems

In some embodiments, a soft robotic system is described, including a soft robot including one or more sensors as described herein, and at least one of a processor and a controller system. Thus, in some embodiments, the soft robotic system includes a soft robot comprising an elastomeric body having one chamber or a plurality of interconnected chambers disposed within the body and a pressurizing inlet that is configured to receive fluid for the chamber or the plurality of interconnected chambers; at least one sensor configured to detect a physical, chemical, or electronic signal; and at least one of a processor configured to operably linked to the sensor to receive the readout from the sensor and interpret the readout; and a control system configured to control the movement of the soft robot based on the readout generated by the one or more sensors or the processor's interpretation of the readout.

Figure 13:
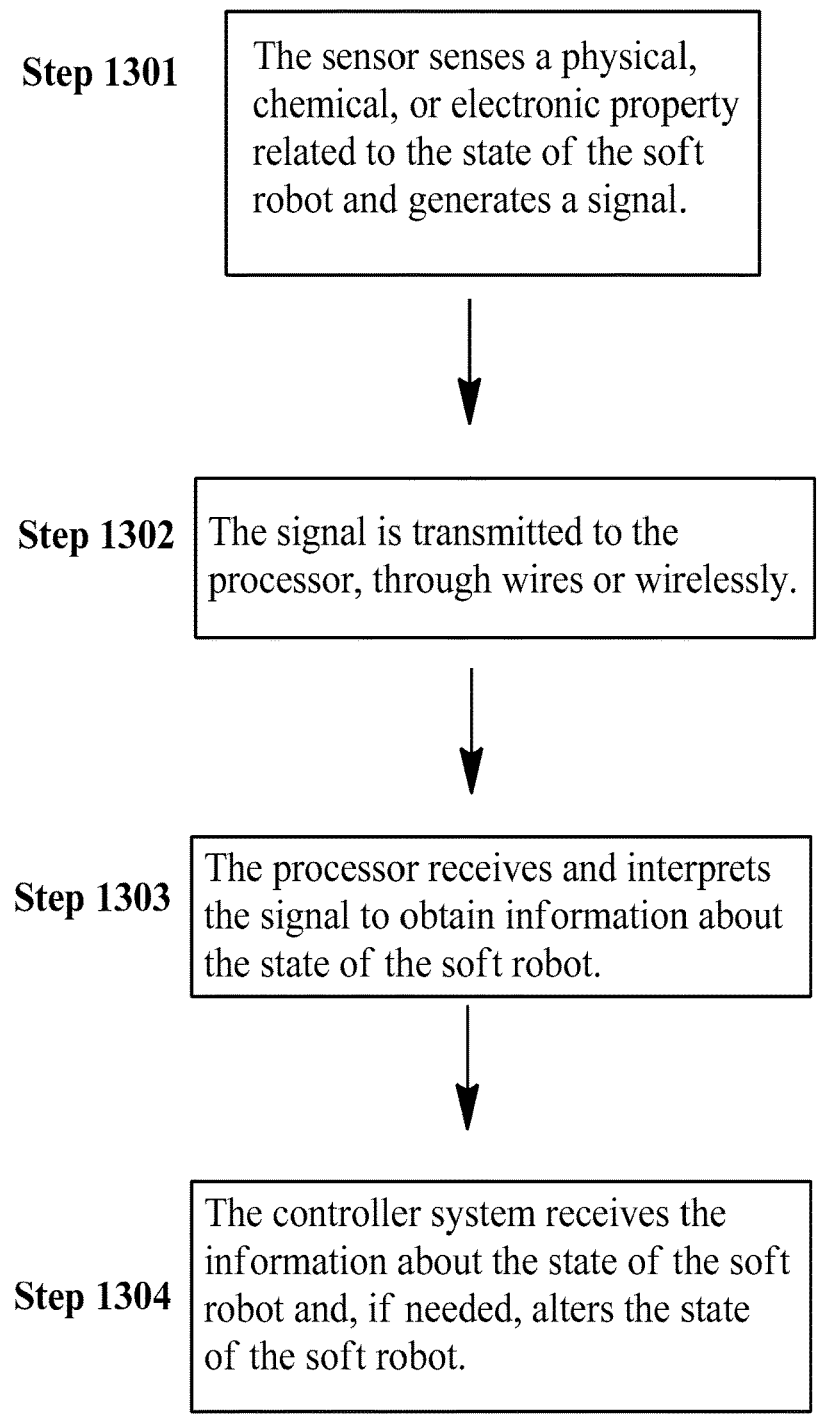
FIG. 13 shows a flow chart of the operation of the soft robotic system described according to one or more embodiments.

A non-limiting example of the operation of the soft robotic system is described with reference to FIG. 13. In step 1301, the sensor senses a physical, chemical, or electronic property related to the state of the soft robot and generates a signal. Subsequently in step 1302, the signal is transmitted to the processor, through wires or wirelessly. The processor receives and interprets the signal to obtain information about the state of the soft robot (step 1303). In certain embodiments, based on the information obtained by the sensors, a user and/or processor can use the readout to estimate the state of the robot. Any know method of data-fitting can be used by the processor. Finally, the controller system receives the information about the state of the soft robot and, if needed, alters the state of the soft robot.

Soft Robot Capable of Locomotion

An embodiment of the soft robot is shown with reference to FIG. 14a-c. FIG. 14a shows a photograph of a soft robot crawling under a glass plate. FIG. 14b shows (on the left) an illustration of the pneumatic network on the top layer of the robot shown in FIG. 14a which contains soft actuators 1401; and FIG. 14b shows (on the right) an illustration of the strain limiting layer 1402 on the bottom of the robot shown in FIG. 14a. FIG. 14c shows an illustration of a distributed network of sensors on the strain limiting layer of a soft robot, which include a processing unit 1405, sensors 1403 and serpentine wires 1407 connecting the sensors 1403 and the processing unit 1405. This is a signal intensity gradient based detection method that can determine the direction from which a signal is being emitted. Thus, a single signal can be measured by a spatially distributed network of sensors. Since the intensity of a signal diminishes as a function of distance from the source of the signal, one can use the gradient in measured signal intensity across a distributed network of sensors to determine the direction the signal is coming from. For example one could determine the direction that a sound is coming from using a distributed network of microphones. In this example the microphones that are closest to the source of the sound will measure the highest intensity audio signal while the microphones that are the furthest away from the source will measure the lowest intensity audio signal. These microphones will next send their intensity measurements to a processor for analysis. This processor will use both the measurements of intensity across the network in conjunction with its knowledge of the relative distance between all the microphones in the network to determine the direction from which the sound originated.

Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2%) can be understood as being within the scope of the description; likewise, if a particular shape is referenced, the shape is intended to include imperfect variations from ideal shapes, e.g., due to manufacturing tolerances. Percentages or concentrations expressed herein can represent either by weight or by volume.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments. Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly. Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise.

It will be appreciated that while a particular sequence of steps has been shown and described for purposes of explanation, the sequence may be varied in certain respects, or the steps may be combined, while still obtaining the desired configuration. Additionally, modifications to the disclosed embodiment and the invention as claimed are possible and within the scope of this disclosed invention.

What is claimed is:

1. A soft robotic device comprising:
   an elastomeric body having one chamber or a plurality of interconnected chambers disposed within the elastomeric body and a pressurizing inlet that is configured to receive a pressurizing fluid for the chamber or the plurality of interconnected chambers;
   a plurality of sensors configured to generate a readout correlating with a state of the soft robotic device to actuate the soft robotic device; and
   a processor operably linked to the plurality of sensors to receive the readout from the plurality of sensors and interpret the readout;
   wherein the soft robotic device further comprises a strain limited layer disposed along one side of the elastomeric body and stiffer or less stretchable than the elastomeric body;
   wherein the plurality of sensors comprises a network of electromagnetic sensors embedded in the strain limited layer; and
   wherein the processor comprises a magnetic motion capture system and the network of electromagnetic sensors acts as active markers for the magnetic motion capture system for use as a data input for the processor to conduct a finite element analysis or to fit a model of the soft robotic device.

2. The soft robotic device of claim 1, wherein the state of the soft robotic device is a plurality of variables selected from the group consisting of a position of the soft robotic device, an orientation of the soft robotic device, a velocity of the soft robotic device, an acceleration of the soft robotic device, an elapsed time since the soft robotic device is last actuated, a maximum pressure of the pressurizing fluid used during a last actuation of the soft robotic device, a volume of the soft robotic device, a surface curvature of the elastomeric body, a material stress at points along the elastomeric body, a material strain at points along the elastomeric body, a force being applied by the soft robotic device on an object, a temperature of the soft robotic device, a pressure inside and outside the soft robotic device, and a pressure differential between the pressurizing fluid inside the chamber and an ambient pressure in an external environment of the soft robotic device.

3. The soft robotic device of claim 1, wherein the plurality of sensors are configured to detect a physical, chemical, or electronic signal.

4. The soft robotic device of claim 1, wherein plurality of sensors further comprise sensors embedded in or attached to the elastomeric body.

5. The soft robotic device of claim 1, wherein the pressurizing inlet is configured to receive the pressurizing fluid from an external fluid source.

6. The soft robotic device of claim 1, wherein at least one of the plurality of sensors are selected from the group consisting of thermal sensors, strain sensors, stress sensors, volumetric sensors, torque sensors, shear sensors, chemical sensors, biological sensors, neural sensors, pressure sensors, barometric pressure sensors, vacuum sensors, altimeters, conductivity sensors, impedance sensors, inertial measurement units, force sensing resistors, laser range finders, acoustic range finders, magnetometers, Hall Effect sensors, magneto-diodes, magneto-transistors, microelectromechanical system magnetic field sensors, microphones, photo detectors, accelerometers, gyroscope sensors, flow sensors, humidity sensors, chemiresistors, volatile organic compound sensors, heavy metal sensors, pH sensors, sedimentation sensors, cardiac ablation sensors, myoelectric sensors, electronic noses, gas sensors, oxygen sensors, nitrogen sensors, natural gas sensors, VX gas sensors, sarin gas sensors, mustard gas sensors, explosives detectors, metal detectors, radiological detectors, voltage sensors, and current sensors.

7. The soft robotic device of claim 1, wherein at least one of the plurality of sensors are selected from the group consisting of volumetric, positional, strain, flow, Inertial Measurement Unit (IMU), temperature, and magnetic sensors.

8. The soft robotic device of claim 1, wherein the soft robotic device comprises at least two different sensors.

9. The soft robotic device of claim 1, wherein at least one of the plurality of sensors are non-stretchable or stretchable.

10. The soft robotic device of claim 1, wherein at least one of the plurality of sensors is a microelectromechanical system (MEMS) sensor, a pressure sensor, a force sensor, or an Inertial Measurement Unit (IMU).

11. The soft robotic device of claim 1, wherein the soft robotic device is a gripper or a robotic hand.

12. The soft robotic device of claim 11, wherein the gripper comprises additional sensors configured to perform grasp detection or configured to control a force the gripper applies to an object it is grasping.

13. The soft robotic device of claim 1, wherein the soft robotic device is an end-of-arm tool for a robotic arm, delta robot, scara robot, gantry system or a mobile robotic platform.

14. A soft robotic system comprising:
a soft robotic device comprising:
an elastomeric body having one chamber or a plurality of interconnected chambers disposed within the elastomeric body and a pressurizing inlet that is configured to receive a pressurizing fluid for the chamber or the plurality of interconnected chambers to actuate the soft robotic device;
a plurality of sensors configured to generate a readout correlating with a state of the soft robotic device;
wherein the soft robotic device further comprises a strain limited layer disposed along one side of the elastomeric body and stiffer or less stretchable than the elastomeric body; and
wherein the plurality of sensors comprises a network of electromagnetic sensors embedded in the strain limited layer;
a processor operably linked to the plurality of sensors to receive the readout from the plurality of sensors and interpret the readout, wherein the processor comprises a magnetic motion capture system and the network of electromagnetic sensors acts as active markers for the magnetic motion capture system for use as a data input for the processor to fit a model of the soft robotic device; and
a control system configured to control a movement of the soft robotic system based on the readout or the interpretation of the readout.

15. The soft robotic system of claim 14, wherein the plurality of sensors comprise a network of strain sensors, accelerometers, magnetometers, gyroscopes, torque sensors, shear sensors, force sensors, or Inertial Measurement Unit (IMU) sensor packages.

16. The soft robotic system of claim 14, wherein the processor is configured to conduct a finite element analysis or to fit a reduced system model based on the readout.

17. The soft robotic system of claim 14, wherein the network of electromagnetic sensors comprise a pressure sensor, a flow sensor, or a volumetric sensor.

18. The soft robotic system of claim 17, wherein the readout is a pressure readout.

19. The soft robotic system of claim 17, further comprising:
instructions embedded in the processor to instruct the control system to begin a corrective action if the pressure sensor generates a pressure readout over a threshold value; or
instructions embedded in the processor to instruct the control system to begin a corrective action if the flow sensor generates a flow rate readout over a threshold value;
or
instructions embedded in the processor to instruct the control system to begin a corrective action if the volumetric sensor generates a fluid volume inside the chamber to be over a threshold value.

20. The soft robotic system of claim 14, wherein at least one of the plurality of sensors is a force sensor and the soft robotic system further comprises instructions embedded in the processor to instruct the control system to begin a corrective action once the force sensor detects a force readout over a threshold value.

21. The soft robotic system of claim 14, wherein at least one of the plurality of sensors is a force sensor and the processor is configured to interpret the force sensor's readout to determine the elastomeric body's morphology.

22. The soft robotic system of claim 21, wherein the processor is configured to determine the soft robotic device's morphology based on the force sensor's readout in conjunction with an inflation pressure and a volume of the pressurizing fluid received by the chamber or the plurality of interconnected chambers.

23. The soft robotic system of claim 14, wherein at least one of the plurality of sensors is an Inertial Measurement Unit (IMU).

24. The soft robotic system of claim 23, wherein the processor is configured to estimate the size, shape, or size and shape of an object in contact with the soft robotic device based on the readout.

25. The soft robotic system of claim 23, wherein the control system controls the soft robotic device to carry out a range of motions, or limit a range of motions.

26. The soft robotic system of claim 14, wherein the soft robotic system is a surgical device selected from the group consisting of retractors, stents, endoscopes, arthroscopes, and laparoscopic instruments.

27. The soft robotic system of claim 14, wherein at least one of the plurality of sensors comprises a temperature sensor to monitor changes in the operation temperature of the soft robot; and the control system is configured to control the pressurizing inlet's pressure in response to changes in temperature based on the temperature sensor's readout.

28. The soft robotic system of claim 14, wherein at least one of the plurality of sensors comprises a flow sensor to monitor changes in an operation flow rate or a pressure of the pressurized fluid through the pressurizing inlet; and the control system is configured to control the operation flow rate of the pressurized fluid based on the readout of the flow sensor.

29. The soft robotic system of claim 14, wherein the processor is configured to interpret the readout from the plurality of sensors to perform real time measurement of the soft robotic device's morphology and to send instructions to the control system to compensate for hysteresis.

30. A method for sensing a state of a soft robotic device, comprising
obtaining a readout from a plurality of sensors transmitted to a processor, wherein the processor comprises a magnetic motion capture system; and
determining the state of the soft robotic device;
wherein the soft robotic device comprises
an elastomeric body having one chamber or a plurality of interconnected chambers disposed within the elastomeric body and a pressurizing inlet that is configured to receive a pressurizing fluid for the chamber or the plurality of interconnected chambers to actuate the soft robotic device;
the plurality of sensors configured to generate the readout correlating with the state of the soft robotic device;
wherein the soft robotic device further comprises a strain limited layer disposed along one side of the elastomeric body and stiffer or less stretchable than the elastomeric body; and
wherein the plurality of sensors comprises a network of electromagnetic sensors embedded in the strain limited layer, wherein the network of electromagnetic sensors acts as active markers for the magnetic motion capture system for use as a data input for the processor; and
fitting a model of the soft robotic device based on the readout from the network of electromagnetic sensors using the processor.

31. The method of claim 30, wherein fitting the model of the soft robotic device comprises conducting a finite element analysis or to fit a reduced system model based on the readout from the network of magnetic sensors using the processor.

32. The method of claim 30, wherein at least one of the plurality of sensors is a flow, pressure, Inertial Measurement Unit IMU), volumetric, or force sensor, wherein the soft robotic device further comprises a control system, and the method further comprises:

instructing the control system to begin a corrective action if the pressure sensor generates a pressure readout over a threshold value; or
instructing the control system to begin a corrective action if the flow sensor generates a flow rate readout over a threshold value; or
instructing the control system to begin a corrective action if the volumetric sensor generates a fluid volume inside the chamber to be over a threshold value; or
instructing the control system to begin a corrective action once the force sensor detect a force readout over a threshold value; or
interpreting the force sensor's readout to determine the elastomeric body's morphology; or
estimating the size, shape, or size and shape of an object in contact with the soft robotic device based on the readout; or
interpreting the readout from the plurality of sensors to perform real time measurement of the soft robotic device's morphology and sending instructions to the control system to compensate for hysteresis.

33. A method for sensing a state of a soft robotic system, comprising obtaining a readout from a plurality of sensors; interpreting the readout by using a processor; and controlling an actuation, a movement, or an actuation and a movement of the soft robotic system based on the readout;
wherein the soft robotic system comprises
a soft robotic device comprising:
an elastomeric body having one chamber or a plurality of interconnected chambers disposed within the elastomeric body and a pressurizing inlet that is configured to receive a pressurizing fluid for the chamber or the plurality of interconnected chambers to actuate the soft robotic device;
the plurality of sensors configured to generate the readout correlating with the state of the soft robotic device;
wherein the soft robotic device further comprises a strain limited layer disposed along one side of the elastomeric body and stiffer or less stretchable than the elastomeric body; and
wherein the plurality of sensors comprises a network of electromagnetic sensors embedded in the strain limited layer;
the processor operably linked to the plurality of sensors to receive the readout from the plurality of sensors and interpret the readout, wherein the processor comprises a magnetic motion capture system and the network of electromagnetic sensors acts as active markers for the magnetic motion capture system for use as a data input for the processor to fit a model of the soft robotic device; and
a control system configured to control a movement of the soft robotic system based on the readout or the processor's interpretation of the readout.

* * * * *